(12) United States Patent
Koyama et al.

(10) Patent No.: US 7,563,827 B2
(45) Date of Patent: Jul. 21, 2009

(54) MODIFIED STANNIC OXIDE SOL, STANNIC OXIDE-ZIRCONIUM OXIDE COMPOSITE SOL, COATING COMPOSITION AND OPTICAL ELEMENT

(75) Inventors: Yoshinari Koyama, Chiba (JP); Motoko Asada, Chiba (JP)

(73) Assignee: Nissan Chemical Industries, Ltd., Tokyo (JP)

( * ) Notice: Subject to any disclaimer, the term of this patent is extended or adjusted under 35 U.S.C. 154(b) by 575 days.

(21) Appl. No.: 10/537,438

(22) PCT Filed: Dec. 3, 2003

(86) PCT No.: PCT/JP03/15486

§ 371 (c)(1),
(2), (4) Date: Jun. 3, 2005

(87) PCT Pub. No.: WO2004/050560

PCT Pub. Date: Jun. 17, 2004

(65) Prior Publication Data

US 2006/0025518 A1   Feb. 2, 2006

(30) Foreign Application Priority Data

| Dec. 3, 2002 | (JP) | ............... 2002-350762 |
| Dec. 3, 2002 | (JP) | ............... 2002-350763 |
| Apr. 1, 2003 | (JP) | ............... 2003-097786 |
| Apr. 1, 2003 | (JP) | ............... 2003-097789 |
| Jun. 5, 2003 | (JP) | ............... 2003-161080 |
| Jun. 5, 2003 | (JP) | ............... 2003-161087 |

(51) Int. Cl.
*B01F 3/12* (2006.01)
*G02B 1/10* (2006.01)

(52) U.S. Cl. .............. 516/90; 516/91; 516/92; 516/928

(58) Field of Classification Search ............... 516/90, 516/77, 78, 88, 91, 92
See application file for complete search history.

(56) References Cited

U.S. PATENT DOCUMENTS

| 5,366,545 | A | 11/1994 | Yajima et al. |
| 5,460,738 | A | 10/1995 | Watanabe et al. |
| 6,296,943 | B1 | 10/2001 | Watanabe et al. |
| 6,355,694 | B1 | 3/2002 | Suzuki et al. |
| 6,626,987 | B1 | 9/2003 | Suzuki et al. |
| 7,208,229 | B2 * | 4/2007 | Suzuki et al. ............ 428/447 |
| 2004/0086724 | A1 | 5/2004 | Suzuki et al. |
| 2006/0025518 | A1 | 2/2006 | Koyama et al. |

FOREIGN PATENT DOCUMENTS

| EP | 0 748 768 A1 | 12/1996 |
| EP | 1 041 040 A2 | 10/2000 |
| EP | 1 077 236 A1 | 2/2001 |
| JP | 50-40119 | 12/1975 |
| JP | 52-11261 | 1/1977 |
| JP | 53-111336 | 9/1978 |
| JP | 54-52686 | 4/1979 |
| JP | 55-13747 | 1/1980 |
| JP | 56-166214 | 12/1981 |
| JP | 57-23611 | 2/1982 |
| JP | 57-54901 | 4/1982 |
| JP | 59-133211 | 7/1984 |
| JP | 60-199016 | 10/1985 |
| JP | 62-151801 | 7/1987 |
| JP | 63-37142 | 7/1988 |
| JP | 63-275682 | 11/1988 |
| JP | 64-54021 | 3/1989 |
| JP | 3-172369 | 7/1991 |
| JP | 3-217230 | 9/1991 |
| JP | 6-24746 | 2/1994 |
| JP | 7-25549 | 3/1995 |
| JP | 9-80203 | 3/1997 |
| JP | 10-251018 | 9/1998 |
| JP | 2001-122621 | 5/2001 |
| JP | 2001-123115 | 5/2001 |

OTHER PUBLICATIONS

U.S. Appl. No. 11/266,344, filed Nov. 4, 2005, Koyama, et al.
Derwent Publications, AN 1991-263167, XP-002381503, JP 03-172369, Jul. 25, 1991.
Derwent Publications, AN1998-571541, XP-002381504, JP 10-251018, Sep. 22, 1998.

* cited by examiner

*Primary Examiner*—Timothy J Kugel
(74) *Attorney, Agent, or Firm*—Oblon, Spivak, McClelland, Maier & Neustadt, P.C.

(57) ABSTRACT

It is to provide a sol useful as a component of a hard coating agent to be applied on the surface of a plastic lens or useful for other applications, and its production process.

A sol containing modified metal oxide particles which comprise, as nuclei, colloidal particles (A) being stannic oxide particles or composite particles comprising stannic oxide particles and zirconium oxide particles, containing these oxides in a weight ratio of $ZrO_2:SnO_2$ of from 0:1 to 0.50:1 and having particle sizes of from 4 to 50 nm, and as a coating covering the surface of the nuclei, alkylamine-containing $Sb_2O_5$ colloidal particles, an oligomer thereof or a mixture thereof (B1), or composite colloidal particles comprising diantimony pentaoxide and silica, an oligomer thereof or a mixture thereof (B2), in a weight ratio of (B)/(A) of from 0.01 to 0.50 based on the weights of the metal oxides, and have particle sizes of from 4.5 to 60 nm. A coating composition containing a silicon-containing substance and the above particles. An optical element covered with the coating composition.

1 Claim, No Drawings

MODIFIED STANNIC OXIDE SOL, STANNIC OXIDE-ZIRCONIUM OXIDE COMPOSITE SOL, COATING COMPOSITION AND OPTICAL ELEMENT

TECHNICAL FIELD

The present invention relates to a sol of modified stannic oxide or modified stannic oxide-zirconium oxide composite colloidal particles having particle sizes of from 4.5 to 60 nm, formed by covering the surface of tin oxide colloidal particles or stannic oxide-zirconium oxide composite colloidal particles with alkylamine-containing $Sb_2O_5$ colloidal particles or composite colloidal particles of diantimony pentaoxide and silica, and its production process.

The present invention relates to a coating composition which provides a coating film having excellent warm water resistance and having no decrease in weather resistance and light resistance even when a vapor deposition film (such as an antireflection film) of an inorganic oxide is provided on the coating film, and an optical element.

BACKGROUND ART

In order to improve the surface of plastic lenses which became used widely in recent years, as a component for a hard coating agent to be applied to said surface, sols of a metal oxide having a high refractive index have been used.

A stable sol of tungstic oxide alone has not been known yet, but a sol having a $WO_3$:$SiO_2$:$M_2O$ molar ratio (wherein M is an alkali metal atom or an ammonium group) of 4 to 15:2 to 5:1, obtained by addition of a silicate, has been proposed (e.g. JP-A-54-52686).

A silicate-stannate composite sol having a molar ratio of Si:Sn of 2 to 1000:1, has been proposed (e.g. JP-B-50-40119).

A hard coating agent which contains particles of an oxide of a metal such as Al, Ti, Zr, Sn or Sb, having particle sizes of from 1 to 300 nm, has been disclosed (e.g. JP-B-63-37142).

A stable sol containing colloidal particles of a modified metal oxide having particle sizes of from 4.5 to 60 nm, which comprise colloidal particles of an oxide of a metal with a valence of 3, 4 or 5, having particle sizes of from 4 to 50 nm, as nuclei, and colloidal particles of a tungstic oxide-stannic oxide composite having a $WO_3$/$SnO_2$ weight ratio of from 0.5 to 100 and having particle sizes of from 2 to 7 nm, covering the surface of the colloidal particles as nuclei, wherein the content of the total metal oxides is from 2 to 50 wt %, has been proposed (e.g. JP-A-3-217230).

A stable sol of a modified $SnO_2$—$ZrO_2$ composite which contains particles comprising colloidal particles of a $SnO_2$—$ZrO_2$ composite having a weight ratio of $ZrO_2$/$SnO_2$ of from 0.02 to 1.0 and having particle sizes of from 4 to 50 nm, as nuclei, and colloidal particles of a $WO_3$—$SnO_2$ composite having a $WO_3$/$SnO_2$ weight ratio of from 0.5 to 100 and having particle sizes of from 2 to 7 nm, covering the surface of the colloidal particles as nuclei, has been proposed (e.g. JP-A-6-24746).

A stable modified metal oxide sol containing particles (C) which comprise, as nuclei, colloidal particles (A) of a metal oxide having primary particle sizes of from 2 to 60 nm, and a coating (B) comprising colloidal particles of an acidic oxide, covering the surface of the nuclei, wherein the particles (C) are contained in a proportion of from 2 to 50 wt % as calculated as metal oxides, and having primary particle sizes of from 2 to 100 nm, has been disclosed. Further, a sol wherein the metal oxide particles as the nuclei are $SnO_2$ particles or $SnO_2$—$ZrO_2$ composite colloidal particles, and the coating is made of alkylamine-containing $Sb_2O_5$ particles (M/$Sb_2O_5$ molar ratio of from 0.02 to 4.00) has been disclosed (e.g. JP-A-2001-122621).

A process for producing a silicate-antimonate composite sol liquid or a silicate-stannate composite sol liquid, which comprises mixing an alkali silicate aqueous solution or a silicate sol liquid with an alkali antimonate aqueous solution or an alkali stannate aqueous solution in a molar ratio of Si:Sb or Si:Sn of 2 to 1,000:1, and subjecting the mixed liquid to cation exchange with an acid form ion exchanger, has been disclosed (e.g. JP-B-50-40119).

A silica-antimony oxide composite sol having antimony oxide colloidal particles containing an inorganic silicate compound in an amount of from 0.1 to 50 wt % as $SiO_2$ dispersed in a dispersion medium, has been disclosed (e.g. JP-B-7-25549).

Plastic molded products are used in a large quantity by virtue of their advantageous features such as light weight, good processability and high impact resistance. On the other hand, they have drawbacks that the hardness is inadequate, and thus they are susceptible to scratching, they are likely to be eroded by a solvent, they are likely to be electrified and adsorb a dust, and the heat resistance is inadequate. Thus, as compared with inorganic glass molded products, they were practically inferior for use as lenses for eyeglasses or window materials. Accordingly, it has been proposed to apply a protective coating to a plastic molded product. Many compositions have been proposed as coating compositions to be used for such a protective coating.

"A coating composition containing an organic silicon compound or its hydrolysate as the main component (resin component or coating film-forming component)" which was expected to provide a coating film as hard as an inorganic product, has bee used for eyeglass lenses, (e.g. JP-A-52-11261).

This coating composition still does not provide adequate scratch resistance. Accordingly, one having colloidal silica particles added to the above coating composition has been proposed, which is used practically for eyeglass lenses (e.g. JP-A-53-111336).

Heretofore, plastic lenses for eyeglasses have been produced by casting diethylene glycol bisallyl carbonate in a monomer state, followed by polymerization. The lenses produced in such a manner have a refractive index of about 1.50, which is low as compared with the refractive index of about 1.52 of glass lenses, and in the case of lenses for short sighted, there is a problem that the peripheral thickness has to be increased. Accordingly, in recent years, there has been development of monomers having higher refractive indices than the diethylene glycol bisallyl carbonate, and resin materials having high refractive indices have been proposed (e.g. JP-A-55-13747, JP-A-56-166214, JP-A-57-23611, JP-A-57-54901, JP-A-59-133211, JP-A-60-199016 and JP-A-64-54021).

For lenses made of such resins having high refractive indices, a method of using a colloidal dispersion of fine particles of an oxide of a metal such as Sb or Ti, for a coating material, has been proposed (e.g. JP-A-62-151801, JP-A-63-275682).

Further, a coating composition comprising a silane coupling agent, and a stable modified metal oxide sol containing particles (C) which comprises, as nuclei, colloidal particles (A) of a metal oxide having primary particle sizes of from 2 to 60 nm, and a coating (B) comprising colloidal particles of an acidic oxide, covering the surface of the nuclei, wherein the particles (C) are contained in a proportion of from 2 to 50 wt % as calculated as metal oxides, and having primary particle sizes of from 2 to 100 nm, has been disclosed. Further, a coating composition wherein the metal oxide colloidal particles as nuclei are $SnO_2$ particles or $SnO_2$—$ZrO_2$ composite colloidal particles, and the coating is made of alkylamine-containing $Sb_2O_5$ particles ($M/Sb_2O_5$ molar ratio of from 0.02 to 4.00) has been disclosed (e.g. JP-A-2001-123115).

DISCLOSURE OF THE INVENTION

A conventional coating composition having a silica sol added thereto, has a problem that the coating film is likely to have interference fringes which impair the appearance of the lenses. Further, in lenses, an antireflection film (composed of a multilayer structure film comprising thin films of inorganic oxides, based on an optical interference theory) is formed in many cases, on the coating film. In such a case, the antireflection film tends to exhibit, for example, a reflection color of extremely pale green, and this reflection color changes depending upon the position on the lens surface to form flecking.

Further, a coating composition prepared by using a titanium oxide sol has a problem that the titanium oxide sol has a low compatibility with a silane coupling agent or its hydrolysate, the stability tends to be low, and the coating layer formed by this coating composition tends to be poor in water resistance and tends to be blued by irradiation with ultraviolet rays.

A coating composition prepared by using an antimony oxide sol has a problem that a coating layer formed from this coating composition will not have a sufficiently high refractive index, although the stability and the compatibility of the antimony oxide sol with a silane coupling agent or its hydrolysate are favorable.

If a conventional metal oxide sol, particularly a cationic metal oxide sol, is used as a component for a hard coating agent, not only the stability of the obtained hard coating agent tends to be insufficient, but also e.g. transparency, adhesion and weather resistance of the cured coating of the hard coating agent tend to be insufficient. Further, in a case where a $Sb_2O_5$ sol is used as a component for a hard coating agent, the refractive index of the cured coating will no longer increase adequately with this $Sb_2O_5$ sol if the refractive index of the plastic substrate for a lens is at least 1.60, since the refractive index of $Sb_2O_5$ is a level of from 1.65 to 1.70.

The above sol of tungstic oxide as disclosed in JP-A-54-52686 is obtained by adding a silicate to an aqueous solution of tungstic oxide obtainable by subjecting an aqueous solution of a tungstate to cation exchange. However, the sol is stable only in a strong acidic condition, and its effect to increase the refractive index of the coating film is small when used as a component for a hard coating agent.

The above silicate-stannate composite sol as disclosed in JP-B-50-40119 is obtained by subjecting a mixed aqueous solution of an alkali silicate and an alkali stannate to cation exchange. However, its effect to increase the refractive index of the coating film is also small when used as a component for a hard coating agent.

The above modified metal oxide sol as disclosed in JP-A-3-217230 has a refractive index of at least 1.7, is stable, can be used as a component for a hard coating agent for plastic lenses, and substantially satisfies performances required for a hard coat film, such as scratch resistance, transparency, adhesion, water resistance and weather resistance.

The above modified stannic oxide-zirconium oxide sol as disclosed in JP-A-6-24746 has a refractive index of at least 1.7, is stable, can be used as a component for a hard coating agent for plastic lenses, and substantially satisfies performances required for a hard coat film, such as scratch resistance, transparency and adhesion.

It is an object of the present invention to provide a metal oxide sol which is a stable modified stannic oxide or modified stannic oxide-zirconium oxide sol, which further improves scratch resistance, transparency, adhesion, water resistance, weather resistance, etc. of a hard coat film employing the modified metal oxide as disclosed in JP-A-3-217230 or JP-A-6-24746, and which is stable in a wide pH range, and which can be mixed with a coating material for a hard coat film as a component to improve performance of a hard coat film to be formed on the surface of a plastic lens.

Further, it is an object of the present invention to provide a coating composition which provides a coating film free from interference fringes or flecking in reflection colors, on a plastic molded product having a moderate to high refractive index of nd=1.54 to 1.70, and an optical element.

Still further, it is an object of the present invention to provide a coating composition for plastic molded products, which is excellent in scratch resistance, surface hardness, abrasion resistance, flexibility, transparency, antistatic properties, dyeability, heat resistance, water resistance, chemical resistance, etc., and an optical element.

Accordingly, the present invention provides the following.

1. A sol containing modified metal oxide particles which comprise, as nuclei, colloidal particles (A) being stannic oxide particles or composite particles comprising stannic oxide particles and zirconium oxide particles, containing these oxides in a weight ratio of $ZrO_2:SnO_2$ of from 0:1 to 0.50:1 and having particle sizes of from 4 to 50 nm, and as a coating covering the surface of the nuclei, alkylamine-containing $Sb_2O_5$ colloidal particles having a $M/Sb_2O_5$ molar ratio (M represents an amine molecule) of from 0.02 to 4.00, an oligomer thereof or a mixture thereof (B1), in a weight ratio of (B1)/(A) of from 0.01 to 0.50 based on the weights of the metal oxides, and have particle sizes of from 4.5 to 60 nm.

2. The sol according to the above 1, wherein the colloidal particles (A) are stannic oxide particles.

3. The sol according to the above 1, wherein the colloidal particles (A) are composite colloidal particles comprising stannic oxide particles and zirconium oxide particles in a weight ratio of $ZrO_2:SnO_2$ of from 0.05:1 to 0.50:1

4. A sol containing modified metal oxide particles which comprise, as nuclei, colloidal particles (A) being stannic oxide particles or composite particles comprising stannic oxide particles and zirconium oxide particles, containing these oxides in a weight ratio of $ZrO_2:SnO_2$ of from 0:1 to 0.50:1 and having particle sizes of from 4 to 50 nm, and as a coating covering the surface of the nuclei, composite colloidal particles comprising diantimony pentaoxide and silica having a $SiO_2/Sb_2O_5$ molar ratio of from 0.55 to 55, an oligomer thereof or a mixture thereof (B2), in a weight ratio of (B2)/(A) of from 0.01 to 0.50 based on the weights of the metal oxides, and have particle sizes of from 4.5 to 60 nm.

5. The sol according to claim 4, wherein the colloidal particles (A) are stannic oxide particles.

6. The sol according to the above 4, wherein the colloidal particles (A) are composite colloidal particles comprising stannic oxide particles and zirconium oxide particles in a weight ratio of $ZrO_2:SnO_2$ of from 0.05:1 to 0.50:1

7. A process for producing the sol as defined in the above 1 or 2, which comprises the following steps (a1), (b1) and (c1):

step (a1): a step of preparing a stannic oxide aqueous sol containing stannic oxide colloidal particles having particle sizes of from 4 to 50 nm at a $SnO_2$ concentration of from 1 to 50 wt %, step (b1): a step of mixing the stannic oxide aqueous sol obtained in the above step (a1), with an aqueous medium containing alkylamine-containing $Sb_2O_5$ colloidal particles having a $M/Sb_2O_5$ molar ratio (M represents an amine molecule) of from 0.02 to 4.00, an oligomer thereof or a mixture thereof, in a weight ratio of $Sb_2O_5/SnO_2$ as calculated as metal oxides of from 0.01 to 0.50, and step (c1): a step of aging the aqueous medium obtained in step (b1) at a temperature of from 20 to 300° C. for from 0.1 to 50 hours.

8. A process for producing the sol as defined in the above 1 or 3, which comprises the following steps (a2), (b2), (c2) and (d3):

step (a2): a step of mixing a stannic oxide aqueous sol having particle sizes of from 4 to 50 nm and having a $SnO_2$ concentration of from 0.5 to 50 wt %, with an aqueous solution of an oxyzirconium salt having a concentration of from 0.5 to 50 wt % as calculated as $ZrO_2$, in a weight ratio of $ZrO_2/SnO_2$ of from 0.05 to 0.50, and heating the obtained mixed liquid at a temperature of from 60 to 100° C. for 0.1 to 50 hours to prepare a stannic oxide-zirconium oxide composite aqueous sol having particle sizes of from 4 to 50 nm, step (b2): a step of mixing the stannic oxide-zirconium oxide composite aqueous sol obtained in step (a2), with an aqueous medium containing alkylamine-containing $Sb_2O_5$ colloidal particles having a $M/Sb_2O_5$ molar ratio (M represents an amine molecule) of from 0.02 to 4.00, an oligomer thereof or a mixture thereof, in a weight ratio of $Sb_2O_5/(SnO_2+ZrO_2)$ of from 0.01 to 0.50 as calculated as metal oxides, step (c2): a step of aging the aqueous medium obtained in step (b2) at a temperature of from 20 to 300° C. for from 0.1 to 50 hours, and step (d2): a step of bringing the modified stannic oxide-zirconium oxide composite aqueous sol obtained in step (c2) into contact with an anion exchanger to remove anions present in the sol.

9. A process for producing the sol as defined in the above 1 or 2, which comprises the following steps (a3), (b3) and (c3):

step (a3): a step of preparing a stannic oxide aqueous sol subjected to a hydrothermal treatment at a temperature of from 100 to 300° C., and having particle sizes of from 4 to 50 nm and a $SnO_2$ concentration of from 0.5 to 50 wt %, step (b3): a step of mixing the stannic oxide aqueous sol obtained in the above step (a3), with an aqueous medium containing alkylamine-containing $Sb_2O_5$ colloidal particles having a $M/Sb_2O_5$ molar ratio (M represents an amine molecule) of from 0.02 to 4.00, an oligomer thereof or a mixture thereof, in a weight ratio of $Sb_2O_5/SnO_2$ as calculated as metal oxides of from 0.01 to 0.50, and step (c3): a step of aging the aqueous medium obtained in step (b3) at a temperature of from 20 to 300° C. for from 0.1 to 50 hours.

10. A process for producing the sol as defined in the above 1 or 3, which comprises the following steps (a4), (b4), (c4) and (d4):

step (a4): a step of mixing a stannic oxide aqueous sol subjected to a hydrothermal treatment at a temperature of from 100 to 300° C., and having particle sizes of from 4 to 50 nm and a $SnO_2$ concentration of from 0.5 to 50 wt %, with an aqueous solution of an oxyzirconium salt having a concentration of from 0.5 to 50 wt % as calculated as $ZrO_2$, in a weight ratio of $ZrO_2/SnO_2$ of from 0.05 to 0.50, and heating the obtained mixed liquid at a temperature of from 60 to 100° C. for from 0.1 to 50 hours to prepare a stannic oxide-zirconium oxide composite aqueous sol having particle sizes of from 4 to 50 nm, step (b4): a step of mixing the stannic oxide-zirconium oxide composite aqueous sol obtained in step (a4), with an aqueous medium containing alkylamine-containing $Sb_2O_5$ colloidal particles having a $M/Sb_2O_5$ molar ratio (M represents an amine molecule) of from 0.02 to 4.00, an oligomer thereof or a mixture thereof, in a weight ratio of $Sb_2O_5/(SnO_2+ZrO_2)$ of from 0.01 to 0.50 as calculated as metal oxides, step (c4): a step of aging the aqueous medium obtained in step (b4) at a temperature of from 20 to 300° C. for from 0.1 to 50 hours, and step (d4): a step of bringing the modified stannic oxide-zirconium oxide composite aqueous sol obtained in step (c4) into contact with an anion exchanger to remove anions present in the sol.

11. A process for producing the sol as defined in the above 4 or 5, which comprises the following steps (a5), (b5) and (c5):

step (a5): a step of preparing a stannic oxide aqueous sol containing stannic oxide colloidal particles having particle sizes of from 4 to 50 nm at a $SnO_2$ concentration of from 1 to 50 wt %, step (b5): a step of mixing the stannic oxide aqueous sol obtained in the above step (a5), with an aqueous medium containing composite colloidal particles of diantimony pentaoxide and silica having a $SiO_2/Sb_2O_5$ molar ratio of from 0.55 to 55, an oligomer thereof or a mixture thereof, in a weight ratio of $(Sb_2O_5+SiO_2)/(SnO_2)$ as calculated as metal oxides of from 0.01 to 0.50, and step (c5): a step of aging the aqueous medium obtained in step (b5) at a temperature of from 20 to 300° C. for from 0.1 to 50 hours.

12. A process for producing the sol as defined in the above 4 or 6, which comprises the following steps (a6), (b6), (c6) and (d6):

step (a6): a step of mixing a stannic oxide aqueous sol having particle sizes of from 4 to 50 nm and a $SnO_2$ concentration of from 0.5 to 50 wt %, with an aqueous solution of an oxyzirconium salt having a concentration of from 0.5 to 50 wt % as calculated as $ZrO_2$, in a weight ratio of $ZrO_2/SnO_2$ of from 0.05 to 0.50, and heating the obtained mixed liquid at a temperature of from 60 to 100° C. for from 0.1 to 50 hours to prepare a stannic oxide-zirconium oxide composite aqueous sol having particle sizes of from 4 to 50 nm, step (b6): a step of mixing the stannic oxide-zirconium oxide composite aqueous sol obtained in step (a6), with an aqueous medium containing composite colloidal particles of diantimony pentaoxide and silica having a $SiO_2/Sb_2O_5$ molar ratio of from 0.55 to 55, an oligomer thereof or a mixture thereof, in a weight ratio of $(Sb_2O_5+SiO_2)/(SnO_2+ZrO_2)$ as calculated as metal oxides of from 0.01 to 0.50, step (c6): a step of aging the aqueous medium obtained in step (b6) at a temperature of from 20 to 300° C. for from 0.1 to 50 hours, and step (d6): a step of bringing the modified stannic oxide-zirconium oxide composite aqueous sol obtained in step (c6) into contact with an anion exchanger to remove anions present in the sol.

13. A process for producing the sol as defined in the above 4 or 5, which comprises the following steps (a7), (b7) and (c7):

step (a7): a step of preparing a stannic oxide aqueous sol subjected to a hydrothermal treatment at a temperature of from 100 to 300° C., and having particle sizes of from 4 to 50 nm and a $SnO_2$ concentration of from 0.5 to 50 wt %, step (b7): a step of mixing the stannic oxide aqueous sol obtained in the above step (a7), with an aqueous medium containing composite colloidal particles of diantimony pentaoxide and silica having a $SiO_2/Sb_2O_5$ molar ratio of from 0.55 to 55, an oligomer thereof or a mixture thereof, in a weight ratio of $(Sb_2O_5+SiO_2)/(SnO_2)$ as calculated as metal oxides of from 0.01 to 0.50, and step (c7): a step of aging the aqueous medium obtained in step (b7) at a temperature of from 20 to 300° C. for from 0.1 to 50 hours.

14. A process for producing the sol as defined in the above 4 or 6, which comprises the following steps (a8), (b8), (c8) and (d8):

step (a8): a step of mixing a stannic oxide aqueous sol subjected to a hydrothermal treatment at a temperature of from 100 to 300° C., and having particle sizes of from 4 to 50 nm and a $SnO_2$ concentration of from 0.5 to 50 wt %, with an aqueous solution of an oxyzirconium salt having a concentration of from 0.5 to 50 wt % as calculated as $ZrO_2$, in a weight ratio of $ZrO_2/SnO_2$ of from 0.05 to 0.50, and heating the obtained mixed liquid at a temperature of from 60 to 100° C. for from 0.1 to 50 hours to prepare a stannic oxide-zirconium oxide composite aqueous sol having particle sizes of from 4 to 50 nm, step (b8): a step of mixing the stannic oxide-zirconium oxide composite aqueous sol obtained in step (a8), with an aqueous medium containing composite colloidal particles of diantimony pentaoxide and silica having a $SiO_2/Sb_2O_5$ molar ratio of from 0.55 to 55, an oligomer thereof or a mixture thereof, in a weight ratio of $(Sb_2O_5+SiO_2)/(SnO_2+ZrO_2)$ as calculated as metal oxides of from 0.01 to 0.50, step (c8): a step of aging the aqueous medium obtained in step (b8) at a temperature of from 20 to 300° C. for from 0.1 to 50 hours, and step (d8): a step of bringing the modified stannic oxide-zirconium oxide composite aqueous sol obtained in step (c8) into contact with an anion exchanger to remove anions present in the sol.

15. A coating composition containing the following components (S) and (T1):

component (S): at least one silicon-containing substance selected from the group consisting of organic silicon compounds of the formulae (I) and (II), and hydrolysates thereof:

$$(R^1)_a(R^3)_b Si(OR^2)_{4-(a+b)} \qquad (I)$$

wherein each of $R^1$ and $R^3$ is an alkyl group, an aryl group, a halogenated alkyl group, a halogenated aryl group, an alkenyl group, or an organic group having an epoxy group, an acryloyl group, a methacryloyl group, a mercapto group, an amino group or a cyano group, which is bonded to the silicon atom by a Si—C bond, $R^2$ is a $C_{1-8}$ alkyl group, an alkoxyalkyl group or an acyl group, and each of a and b is an integer of 0, 1 or 2, provided that a+b is an integer of 0, 1 or 2,

$$[(R^4)_c Si(OX)_{3-c}]_2 Y \qquad (II)$$

wherein $R^4$ is a $C_{1-5}$ alkyl group, X is a $C_{1-4}$ alkyl group or an acyl group, Y is a methylene group or a $C_{2-20}$ alkylene group, and c is an integer of 0 or 1;

component (T1): modified metal oxide particles, which comprise, as nuclei, colloidal particles (A) being stannic oxide particles or composite particles comprising stannic oxide particles and zirconium oxide particles, containing these oxides in a weight ratio of $ZrO_2:SnO_2$ of from 0:1 to 0.50:1 and having particle sizes of from 4 to 50 nm, and as a coating covering the surface of the nuclei, alkylamine-containing $Sb_2O_5$ colloidal particles having a $M/Sb_2O_5$ molar ratio (M represents an amine molecule) of from 0.02 to 4.00, an oligomer thereof or a mixture thereof (B1), in a weight ratio of (B1)/(A) of from 0.01 to 0.50 based on the weights of the metal oxides, and have particle sizes of from 4.5 to 60 nm.

16. The coating composition according to the above 15, wherein the colloidal particles (A) are stannic oxide particles.

17. The coating composition according to the above 15, wherein the colloidal particles (A) are composite colloidal particles comprising stannic oxide particles and zirconium oxide particles in a weight ratio of $ZrO_2:SnO_2$ of from 0.05:1 to 0.50:1

18. The coating composition according to any one of the above 15 to 17, wherein the coating (B1) in the component (T1) further contains an alkylamine-containing silica.

19. A coating composition containing the following components (S) and (T2):

component (S): at least one silicon-containing substance selected from the group consisting of organic silicon compounds of the formulae (I) and (II), and hydrolysates thereof:

$$(R^1)_a(R^3)_b Si(OR^2)_{4-(a+b)} \qquad (I)$$

wherein each of $R^1$ and $R^3$ is an alkyl group, an aryl group, a halogenated alkyl group, a halogenated aryl group, an alkenyl group, or an organic group having an epoxy group, an acryloyl group, a methacryloyl group, a mercapto group, an amino group or a cyano group, which is bonded to the silicon atom by a Si—C bond, $R^2$ is a $C_{1-8}$ alkyl group, an alkoxyalkyl group or an acyl group, and each of a and b is an integer of 0, 1 or 2, provided that a+b is an integer of 0, 1 or 2,

$$[(R^4)_c Si(OX)_{3-c}]_2 Y \qquad (II)$$

wherein $R^4$ is a $C_{1-5}$ alkyl group, X is a $C_{1-4}$ alkyl group or an acyl group, Y is a methylene group or a $C_{2-20}$ alkylene group, and c is an integer of 0 or 1;

component (T2): modified metal oxide particles, which comprise, as nuclei, colloidal particles (A) being stannic oxide particles or composite particles comprising stannic oxide particles and zirconium oxide particles, containing these oxides in a weight ratio of $ZrO_2:SnO_2$ of from 0:1 to 0.50:1 and having particle sizes of from 4 to 50 nm, and as a coating covering the surface of the nuclei, composite colloidal particles comprising diantimony pentaoxide and silica having a $SiO_2/Sb_2O_5$ molar ratio of from 0.55 to 55, an oligomer thereof or a mixture thereof (B2), in a weight ratio of (B2)/(A) of from 0.01 to 0.50 based on the weights of metal oxides, and have particle sizes of from 4.5 to 60 nm.

20. The coating composition according to the above 19, wherein the colloidal particles (A) are stannic oxide particles.

21. The coating composition according to the above 19, wherein the colloidal particles (A) are composite colloidal particles comprising stannic oxide particles and zirconium oxide particles in a weight ratio of $ZrO_2:SnO_2$ of from 0.05:1 to 0.50:1.

22. The coating composition according to any one of the above 19 to 21, wherein the coating (B2) in the component (T1) further contains an alkylamine-containing silica.

23. The coating composition according to any one of the above 15 to 22, wherein the component (A) is at least one silicon-containing substance selected from the group consisting of the organic silicon compound of the formula (I) and a hydrolysate thereof.
24. The coating composition according to any one of the above 15 to 23, which contains at least one curing catalyst selected from the group consisting of a metal salt, a metal alkoxide and a metal chelate compound.
25. An optical element comprising an optical substrate and a cured film formed from the coating composition as defined in any one of the above 15 to 24 on the surface of the optical substrate.
26. The optical element according to the above 25, which further has an antireflection film formed on its surface.

EFFECTS OF THE INVENTION

According to the present invention, by the effect of a coating comprising an alkali antimonate, an alkali component-containing diantimony pentaoxide colloid or its oligomer, or a coating having a silica component further added thereto, or a coating comprising a diantimony pentaoxide-silica composite colloid, an oligomer thereof or a mixture thereof, various defects (dispersibility, weather resistance, long-term stability, compatibility with a hard coating agent, bonding properties) of a conventional metal oxide colloid can be reduced, and an excellent modified metal oxide can be obtained. By using the modified stannic oxide and/or stannic oxide-zirconium oxide composite colloid of the present invention as a hard coating agent component, problems of yellowing due to irradiation with ultraviolet rays, and film hardness, water resistance, moisture resistance and compatibility, which arise when a conventional metal oxide sol is used, can be overcome.

According to the present invention, a stable sol of colloidal particles of a modified metal oxide having favorable water resistance and weather resistance is provided, and a sol which can be mixed, as a component to improve performance of a hard coat film to be applied on the surface of a plastic lens, with a coating composition for the hard coat film can be provided.

The sol of metal oxide colloidal particles having their surface modified obtained by the present invention is colorless and transparent, and a dry coating film obtained from the sol has a refractive index of from about 1.75 to about 1.92, has high bonding strength and hardness, and has favorable weather resistance, antistatic properties, heat resistance, abrasion resistance, etc. Further, particularly the weather resistance and the moisture resistance remarkably improve as compared with a conventional one.

The sol of the present invention is stable at a pH of from 1 to 11, preferably from 1.5 to 10, and provides stability sufficient as an industrial product.

Since the colloidal particles of the sol of the present invention are negatively charged, the sol has favorable miscibility with e.g. a sol comprising other negatively charged colloidal particles, and it can be stably mixed with, for example, a silica sol, a diantimony pentaoxide sol, an anionic or nonionic surfactant, an aqueous solution of e.g. polyvinyl alcohol, an anionic or nonionic resin emulsion, water glass, an aqueous solution of e.g. aluminum phosphate, a hydrolysate solution of ethyl silicate, or a silane coupling agent such as γ-glycidoxy trimethoxysilane or a hydrolysate solution thereof.

A cured film obtained from the coating composition of the present invention constitute a coating layer having improved scratched resistance, surface hardness, abrasion resistance, transparency, heat resistance, light resistance and weather resistance, particularly water resistance. Further, the cured film has favorable adhesive properties with a metal deposited film or an antireflection film (made of e.g. an inorganic oxide or a fluoride) to be formed on the coating layer.

The optical element of the present invention is excellent in scratch resistance, surface hardness, abrasion resistance, transparency, heat resistance, light resistance and weather resistance, particularly water resistance, and further, which has favorable appearance with high transparency without interference fringes even when coating is applied on an element having a high refractive index of at least 1.54.

BEST MODE FOR CARRYING OUT THE INVENTION

The present invention provides a sol containing modified metal oxide particles which comprise, as nuclei, colloidal particles (A) being stannic oxide particles or composite particles comprising stannic oxide particles and zirconium oxide particles, containing these oxides in a weight ratio of $ZrO_2$:$SnO_2$ of from 0:1 to 0.50:1 and having particle sizes of from 4 to 50 nm, and as a coating covering the surface of the nuclei, alkylamine-containing $Sb_2O_5$ colloidal particles having a M/$Sb_2O_5$ molar ratio (M represents an amine molecule) of from 0.02 to 4.00, an oligomer thereof or a mixture thereof (B1), in a weight ratio of (B1)/(A) of from 0.01 to 0.50 based on the weights of the metal oxides, and have particle sizes of from 4.5 to 60 nm.

Further, the present invention provides a sol containing modified metal oxide particles which comprise, as nuclei, colloidal particles (A) being stannic oxide particles or composite particles comprising stannic oxide particles and zirconium oxide particles, containing these oxides in a weight ratio of $ZrO_2$:$SnO_2$ of from 0:1 to 0.50:1 and having particle sizes of from 4 to 50 nm, and as a coating covering the surface of the nuclei, composite colloidal particles comprising diantimony pentaoxide and silica having a $SiO_2$/$Sb_2O_5$ molar ratio of from 0.55 to 55, an oligomer thereof or a mixture thereof (B2), in a weight ratio of (B2)/(A) of from 0.01 to 0.50 based on the weights of the metal oxides, and have particle sizes of from 4.5 to 60 nm.

The particle sizes in the above sol are represented by the particle sizes as observed by an electron microscope.

The stannic oxide colloidal particles as nucleus particles (A) to be used for production of the sol of the present invention can easily be made in the form of a sol of colloidal particles having particle sizes at a level of from 4 to 50 nm, by a known method such as an ion exchange method, a peptization method, a hydrolysis method or a reaction method.

The above ion exchange method may, for example, be a method of treating a stannate such as sodium stannate with a hydrogen form cation exchange resin, or a method of treating a stannic salt such as stannic chloride or stannic nitrate with a hydroxyl group form anion exchange resin. The peptization method may, for example, be a method of washing a stannic hydroxide gel obtained by neutralizing a stannic salt with a base or by neutralizing stannic acid with hydrochloric acid, followed by peptization with an acid or a base. The hydrolysis method may, for example, be a method of hydrolyzing a tin alkoxide, or a method of hydrolyzing a basic stannic chloride basic salt under heating, followed by removal of an unnecessary acid. The above reaction method may, for example, be a method of reacting a metal tin powder with an acid.

The stannic oxide aqueous sol produced by the above method may be used as it is, or may be used after subjected to a hydrothermal treatment at a temperature of from 100 to 300° C.

As the hydrothermal treatment, for example, the above stannic oxide aqueous sol is put in an autoclave, and a treatment is carried out at a temperature of from 100 to 300° C. for from 0.1 to 200 hours.

The medium of such a stannic oxide sol may be either water or a hydrophilic organic solvent, however, preferred is an aqueous sol employing water as a medium. Further, the pH of the sol is preferably such a pH as to stabilize the sol, and usually preferably at a level of from 0.2 to 11.5. The stannic oxide sol may contain an optional component such as an alkaline substance, an acidic substance or an oxycarboxylic acid for the purpose of stabilizing the sol, so long as the object of the present invention will be achieved. The concentration of the stannic oxide sol to be used is preferably at a level of from 0.5 to 50 wt % as stannic oxide, however, the concentration is preferably lower, and preferably from 1 to 30 wt %.

The stannic oxide-zirconium oxide composite sol as the nucleus particles (A) to be used for production of the sol of the present invention can be obtained by steps of mixing an oxyzirconium salt with the above stannic oxide sol in a $ZrO_2/SnO_2$ weight ratio of from 0.05 to 0.5 at from 5 to 100° C. for from 0.5 to 3 hours, and then heating the mixture at from 60 to 100° C. for from 0.1 to 50 hours.

The stannic oxide sol to be used may be either a sol preliminarily subjected to a hydrothermal treatment or a sol not subjected to a hydrothermal treatment.

The oxyzirconium salt to be used may, for example, be zirconium oxychloride, zirconium oxynitrate, zirconium oxysulfate, a zirconium oxyhydroxy acid such as zirconium oxyacetate, or zirconium oxycarbonate. Such an oxyzirconium salt may be used as a solid or an aqueous solution, however, it is preferably used in the form of an aqueous solution having a concentration of $ZrO_2$ of from 0.5 to 50 wt %, preferably at a level of from 0.5 to 30 wt %. A water-insoluble salt such as zirconium oxycarbonate can be used when stannic oxide is in the form of an acid sol.

The stannic oxide sol is particularly preferably an alkaline sol stabilized by an organic base such as an amine, and mixing with an oxyzirconium salt is carried out at a temperature of from 5 to 100° C., preferably from room temperature (20° C.) to 60° C. For the mixing, an oxyzirconium salt may be added to the stannic oxide sol with stirring, or the stannic oxide sol may be added to an oxyzirconium salt aqueous solution with stirring, but the latter is preferred. The mixing has to be carried out sufficiently, preferably for from 0.5 to 3 hours.

The alkylamine-containing diantimony pentaoxide colloid, an oligomer thereof or a mixture thereof (B1) to be used for a coating sol in the present invention may be obtained by the following methods (oxidation method, acid decomposition method, etc.). The acid decomposition method may, for example, be a method of reacting an alkali antimonate with an inorganic acid, followed by peptization with an amine (JP-A-60-41536, JP-A-61-227918, JP-A-2001-123115), and the oxidation method may, for example, be a method of oxidizing diantimony trioxide with hydrogen peroxide in the coexistence of an amine or an alkali metal (JP-B-57-11848, JP-A-59-232921) or a method of oxidizing diantimony trioxide with hydrogen peroxide and adding an amine or an alkali metal.

The amine in the above amine-containing diantimony pentaoxide colloid, an oligomer thereof or a mixture thereof, may, for example, be ammonium, a quaternary ammonium or a water soluble amine. Preferably, it may, for example, be an alkylamine such as isopropylamine, diisopropylamine, n-propylamine or diisobutylamine, an aralkylamine such as benzylamine, an alicyclic amine such as piperidine, an alkanolamine such as monoethanolamine or triethanolamine, or a quaternary ammonium such as tetramethylammonium hydroxide. It is particularly preferably diisopropylamine or diisobutylamine. The molar ratio of the alkali component to diantimony pentaoxide in the amine-containing diantimony pentaoxide colloid is preferably from 0.02 to 4.00 as $M/Sb_2O_5$. If it is smaller than this, the colloid to be obtained tends to be poor in stability, and if it is too high, a dry coating film to be obtained by using such a sol tends to have low water resistance, such being unfavorable practically.

The amine-containing diantimony pentaoxide colloidal particles, an oligomer thereof or a mixture thereof (B1) are fine colloidal particles of diantimony pentaoxide, an oligomer thereof or a mixture thereof. With respect to the colloidal particles, particles of at most 20 nm could be observed by an electron microscope. The oligomer is a polymer and can not be observed by an electron microscope. In the present invention, the colloidal particles (A) have particle sizes of from 4 to 50 nm, and the modified metal oxide particles obtained by covering with (B1) have particle sizes of from 4.5 to 60 nm. The increase in the particle size corresponds to the negatively charged colloidal particles, an oligomer thereof or a mixture thereof (B1) which are chemically bonded to the surface of the positively charged colloidal particles (A) and thereby cover the colloidal particles (A).

The amine component is preferably an alkylamine salt of e.g. diisopropylamine, and the molar ratio of amine/$Sb_2O_5$ is from 0.02 to 4.00.

With respect to the above coating, alkylamine-containing silica particles may further be added to the amine-containing diantimony pentaoxide colloidal particles, an oligomer thereof or a mixture thereof.

A composite colloid comprising diantimony pentaoxide and silica, an oligomer thereof or a mixture thereof (B2) to be used for a coating sol in the present invention can be obtained by the following known method (e.g. JP-B-50-40119). Namely, it can be obtained by mixing an alkali silicate aqueous solution or a silicic acid sol liquid with an alkali antimonate aqueous solution, followed by cation exchange with a cation exchange resin.

As the antimony material, preferably a potassium antimonate aqueous solution may be used. As the silica material, sodium silicate, potassium silicate or active silicic acid obtained by cation exchange of each of them, may be used. The molar ratio of $SiO_2/Sb_2O_5$ is from 0.55 to 55.

The composite colloid comprising diantimony pentaoxide and silica, an oligomer thereof or a mixture thereof (B2) is fine composite colloid comprising diantimony pentaoxide and silica, an oligomer thereof or a mixture thereof. With respect to the colloidal particles, particles of at most 5 nm could be observed by an electron microscope. The oligomer is a polymer and can not be observed by an electron microscope. In the present invention, the colloidal particles (A) have particle sizes of from 4 to 50 nm, and the modified metal oxide particles obtained by covering with (B2) have particle sizes of from 4.5 to 60 nm. The increase in the particle size corresponds to the negatively charged colloidal particles comprising diantimony pentaoxide and silica, an oligomer thereof or a mixture thereof (B2) which are chemically bonded to the surface of the positively charged colloidal particles (A) and thereby cover the colloidal particles (A).

The modified stannic oxide or modified stannic oxide-zirconium oxide composite colloidal particles, the surface of which is covered with the amine-containing $Sb_2O_5$ colloid (B1) of the present invention, are negatively charged in the sol.

The above stannic oxide-zirconium oxide composite colloidal particles are positively charged, and the $Sb_2O_5$ colloid is negatively charged. Accordingly, it is considered that the negatively charged $Sb_2O_5$ colloid is electrically attracted to the periphery of the positively charged stannic oxide-zirconium oxide composite colloidal particles by mixing, the $Sb_2O_5$ colloid is bonded to the surface of the positively charged colloidal particles by a chemical bond, and the surface of the positively charged particles as nuclei are covered with the negatively charged $Sb_2O_5$, thereby to form modified stannic oxide-zirconium oxide composite colloidal particles.

However, when the stannic oxide-zirconium oxide composite colloidal particles having particle sizes of from 4 to 50 nm as a nucleus sol and the amine-containing $Sb_2O_5$ colloidal particles, an oligomer thereof or a mixture thereof (B1) as a coating sol are mixed, if the amount of the metal oxide in the coating sol is smaller than 1 part by weight per 100 parts by weight of the metal oxide ($SnO_2$ or $ZrO_2+SnO_2$) in the nucleus sol, no stable sol can be obtained. It is considered that when the amount of the $Sb_2O_5$ colloid is insufficient, the surface of the stannic oxide-zirconium oxide composite colloidal particles as nuclei can not be sufficiently covered with the colloidal particles, and the formed colloidal particles are likely to agglomerate, which makes the formed sol unstable. Accordingly, the amount of the $Sb_2O_5$ colloidal particles or an oligomer thereof to be mixed may be smaller than the amount required to cover the entire surface of the stannic oxide-zirconium oxide composite colloidal particles, but is an amount at least the minimum amount required to form a stable sol of modified stannic oxide-zirconium oxide composite colloidal particles. If the $Sb_2O_5$ colloidal particles or an oligomer thereof in an amount exceeding the amount to be used for the surface coating are used for the above mixing, the obtained sol is merely a stable mixed sol of an aqueous medium containing the $Sb_2O_5$ colloidal particles, an oligomer thereof or a mixture thereof, and the formed sol of modified stannic oxide-zirconium oxide composite colloidal particles.

To modify the stannic oxide-zirconium oxide composite colloidal particles by covering the surface, the amount of the $Sb_2O_5$ colloid, an oligomer thereof or a mixture thereof (B1) to be used is preferably at most 50 parts by weight as the metal oxide in the coating sol per 100 parts by weight of the metal oxide ($SnO_2$ or $ZrO_2+SnO_2$) of the nucleus sol.

The modified stannic oxide or modified stannic oxide-zirconium oxide composite colloidal particles, the surface of which is covered with a composite colloid comprising diantimony pentaoxide and silica, an oligomer thereof or a mixture thereof (B2) in the present invention, are negatively charged in the sol.

The above stannic oxide-zirconium oxide composite colloidal particles are positively charged, and the composite colloid comprising diantimony pentaoxide and silica is negatively charged. Accordingly, it is considered that the negatively charged composite colloid comprising diantimony pentaoxide and silica is electrically attracted to the periphery of the positively charged stannic oxide-zirconium oxide composite colloidal particles by mixing, the composite colloid comprising diantimony pentaoxide and silica is bonded to the surface of the positively charged colloidal particles by a chemical bond, and the surface of the positively charged particles as nuclei is covered with the negatively charged composite colloid comprising diantimony pentaoxide and silica, thereby to form modified stannic oxide-zirconium oxide composite colloidal particles.

However, when the stannic oxide-zirconium oxide composite colloidal particles having particle sizes of from 4 to 50 nm as a nuclei sol and a composite colloid comprising diantimony pentaoxide and silica, an oligomer thereof or a mixture thereof (B2) as a coating sol are mixed, if the amount of the metal oxide in the coating sol is smaller than 1 part by weight per 100 parts by weight of the metal oxide ($SnO_2$ or $ZrO_2+SnO_2$) in the nucleus sol, no stable sol can be obtained. It is considered that when the amount of the composite colloid comprising diantimony pentaoxide and silica is insufficient, the surface of the stannic oxide-zirconium oxide composite colloidal particles as nuclei is not sufficiently covered with the composite colloidal particles, and the formed colloidal particles are likely to agglomerate, which makes the formed sol unstable. Accordingly, the amount of the composite colloidal particles comprising diantimony pentaoxide and silica, an oligomer thereof or a mixture thereof to be mixed may be smaller than the amount required to cover the entire surface of the stannic oxide-zirconium oxide composite colloidal particles, but is an amount at least the minimum amount required to form a stable sol of modified stannic oxide-zirconium oxide composite colloidal particles. If the composite colloidal particles comprising diantimony pentaoxide and silica, an oligomer thereof or a mixture thereof in an amount exceeding the amount to be used for the surface coating are used for the above mixing, the obtained sol is merely a stable mixed sol of an aqueous medium containing the composite colloid of diantimony pentaoxide and silica, an oligomer thereof or a mixture thereof, and the formed sol of modified stannic oxide-zirconium oxide composite colloidal particles.

To modify the stannic oxide-zirconium oxide composite colloidal particles by covering the surface, the amount of the composite colloid comprising diantimony pentaoxide and silica, an oligomer thereof or a mixture thereof (B2) to be used is preferably at most 50 parts by weight as the metal oxide in the coating sol per 100 parts by weight of the metal oxide ($SnO_2$ or $ZrO_2+SnO_2$) in the nucleus sol.

In the present invention, when the stannic oxide is used for nuclei, a stable sol of modified stannic oxide colloidal particles can be obtained from step (a1): a step of preparing a stannic oxide aqueous sol containing stannic oxide colloidal particles having particle sizes of from 4 to 50 nm in a concentration of $SnO_2$ of from 1 to 50 wt %, step (b1): a step of mixing the stannic oxide aqueous sol obtained in the above step (a1) with an aqueous medium containing alkylamine-containing $Sb_2O_5$ colloidal particles having a $M/Sb_2O_5$ molar ratio (M represents an amine molecule) of from 0.02 to 4.00, an oligomer thereof or a mixture thereof, in a weight ratio of $Sb_2O_5/SnO_2$ as calculated as metal oxides of from 0.01 to 0.50, and step (c1): a step of aging the aqueous medium obtained in step (b1) at a temperature of from 20 to 300° C. for from 0.1 to 50 hours. The sol obtained in step (c1) may be further subjected to step (d1) when the stannic oxide sol obtained in step (a1) contains anions. Namely, a stable sol of modified stannic oxide colloidal particles can be obtained by further carrying out step (d1): a step of bringing the modified stannic oxide aqueous sol obtained in step (c1) into contact with an anion exchanger to remove anions present in the sol, and aging the aqueous sol at a temperature of from 20 to 300° C. for from 0.1 to 50 hours. Aging at a temperature of at least 100° C. can be carried out by using an autoclave. The sol is a sol containing modified stannic oxide particles which comprise, as nuclei, stannic oxide colloidal particles (A) having particle sizes of from 4 to 50 nm, and as a coating covering the surface of the nuclei, alkylamine-containing $Sb_2O_5$ colloidal particles having a $M/Sb_2O_5$ molar ratio (M represents an amine molecule) of from 0.02 to 4.00, an oligomer thereof or a mixture thereof (B1), in a weight ratio of (B1)/(A) of from 0.01 to 0.50 based on the weights of the metal oxides, and have particle sizes of from 4.5 to 60 nm.

Further, in the present invention, when composite colloidal particles comprising stannic oxide and zirconium oxide are used for nuclei, a stable sol of modified stannic oxide-zirconium oxide composite colloidal particles can be obtained by step (a2): a step of mixing a stannic oxide aqueous sol having particle sizes of from 4 to 50 nm and having a $SnO_2$ concentration of from 0.5 to 50 wt %, with an aqueous solution of an oxyzirconium salt having a concentration of from 0.5 to 50 wt % as calculated as $ZrO_2$, in a weight ratio of $ZrO_2/SnO_2$ of from 0.05 to 0.50, and heating the obtained mixed liquid at a temperature of from 60 to 100° C. for from 0.1 to 50 hours to prepare a stannic oxide-zirconium oxide composite aqueous sol, step (b2): a step of mixing the stannic oxide-zirconium oxide composite aqueous sol obtained in step (a2), with an aqueous medium containing alkylamine-containing $Sb_2O_5$ colloidal particles having a $M/Sb_2O_5$ molar ratio (M represents an amine molecule) of from 0.02 to 4.00, an oligomer thereof or a mixture thereof, in a weight ratio of $Sb_2O_5/(SnO_2/ZrO_2)$ of from 0.01 to 0.50 as calculated as metal oxides, step (c2): a step of aging the aqueous medium obtained in step (b2) at a temperature of from 20 to 300° C. for from 0.1 to 50 hours, and step (d2): a step of bringing the modified stannic oxide-zirconium oxide composite aqueous sol obtained in step (c2) into contact with an anion exchanger, and aging the aqueous sol at a temperature of from 20 to 300° C. for from 0.1 to 50 hours. Aging at a temperature of at least 100° C. can be carried out by using an autoclave. The sol is a sol containing modified composite colloidal particles comprising stannic oxide particles and zirconium oxide particles, which comprise, as nuclei, composite colloidal particles (A) comprising stannic oxide particles and zirconium oxide particles, containing these oxides in a weight ratio of $ZrO_2:SnO_2$ of from 0.05:1 to 0.50:1 and having particle sizes of from 4 to 50 nm, and as a coating covering the surface of the nuclei, alkylamine-containing $Sb_2O_5$ colloidal particles having a $M/Sb_2O_5$ molar ratio (M represents an amine molecule) of from 0.02 to 4.00, an oligomer thereof or a mixture thereof (B1), in a weight ratio of (B1)/(A) of from 0.01 to 0.50 based on the weights of the metal oxides, and have particle sizes of from 4.5 to 60 nm.

The above production process may be carried out under elevated pressure by using an autoclave.

Namely, in a process of using a stannic oxide sol treated in an autoclave is used for nuclei, a modified stannic oxide aqueous sol can be obtained from step (a3): a step of preparing a stannic oxide aqueous sol subjected to a hydrothermal treatment at a temperature of from 100 to 300° C., and having particle sizes of from 4 to 50 nm and a $SnO_2$ concentration of from 0.5 to 50 wt %, step (b3): a step of mixing the stannic oxide aqueous sol obtained in the above step (a3), with an aqueous medium containing alkylamine-containing $Sb_2O_5$ colloidal particles having a $M/Sb_2O_5$ molar ratio (M represents an amine molecule) of from 0.02 to 4.00, an oligomer thereof or a mixture thereof, in a weight ratio of $Sb_2O_5/SnO_2$ as calculated as metal oxides of from 0.01 to 0.50, and step (c3): a step of aging the aqueous medium obtained in step (b3) at a temperature of from 20 to 300° C. for from 0.1 to 50 hours. The sol obtained in step (c3) may be further subjected to step (d3) when the stannic oxide sol obtained in step (a3) contains anions. Namely, a stable sol of modified stannic oxide colloidal particles can be obtained by further carrying out step (d3): a step of bringing the modified stannic oxide aqueous sol obtained in step (c3) into contact with an anion exchanger to remove anions present in the sol, and aging the aqueous sol at a temperature of from 20 to 300° C. for from 0.1 to 50 hours. Aging at a temperature of at least 100° C. can be carried out by using an autoclave. This sol is a sol containing modified stannic oxide particles which comprise, as nuclei, stannic oxide colloidal particles (A) having particle sizes of from 4 to 50 nm, and as a coating covering the surface of the nuclei, alkylamine-containing $Sb_2O_5$ colloidal particles having a $M/Sb_2O_5$ molar ratio (M represents an amine molecule) of from 0.02 to 4.00, an oligomer thereof or a mixture thereof (B1), in a weight ratio of (B1)/(A) of from 0.01 to 0.50 based on the weights of the metal oxides, and have particle sizes of from 4.5 to 60 nm.

Further, in a process of using an aqueous sol comprising composite particles comprising stannic oxide sol treated in an autoclave and zirconium oxide for nuclei, a stable sol of modified stannic oxide-zirconium oxide composite colloidal particles can be obtained by step (a4): a step of mixing a stannic oxide aqueous sol subjected to a hydrothermal treatment at a temperature of from 100 to 300° C., and having particle sizes of from 4 to 50 nm and a $SnO_2$ concentration of from 0.5 to 50 wt %, with an aqueous solution of an oxyzirconium salt having a concentration of from 0.5 to 50 wt % as calculated as $ZrO_2$, in a weight ratio of $ZrO_2/SnO_2$ of from 0.05 to 0.50, and heating the obtained mixed liquid at a temperature of from 60 to 100° C. for from 0.1 to 50 hours to prepare a stannic oxide-zirconium oxide composite aqueous sol having particle sizes of from 4 to 50 nm, step (b4): a step of mixing the stannic oxide-zirconium oxide composite aqueous sol obtained in step (a4), with an aqueous medium containing alkylamine-containing $Sb_2O_5$ colloidal particles having a $M/Sb_2O_5$ molar ratio (M represents an amine molecule) of from 0.02 to 4.00, an oligomer thereof or a mixture thereof, in a weight ratio of $Sb_2O_5/(SnO_2+ZrO_2)$ of from 0.01 to 0.50 as calculated as metal oxides, step (c4): a step of aging the aqueous medium obtained in step (b4) at a temperature of from 20 to 300° C. for from 0.1 to 50 hours, and step (d4): a step of bringing the modified stannic oxide-zirconium oxide aqueous sol obtained in step (c4) into contact with an anion exchanger, and aging the aqueous sol at a temperature of from 20 to 300° C. for from 0.1 to 50 hours. This sol is a sol containing modified composite colloidal particles comprising stannic oxide particles and zirconium oxide particles, which comprise, as nuclei, composite colloidal particles (A) comprising stannic oxide particles and zirconium oxide particles, containing these oxides in a weight ratio of $ZrO_2:SnO_2$ of from 0.05:1 to 0.50:1 and having particle sizes of from 4 to 50 nm, and as a coating covering the surface of the nuclei, alkylamine-containing $Sb_2O_5$ colloidal particles having a $M/Sb_2O_5$ molar ratio (M represents an amine molecule) of from 0.02 to 4.00, an oligomer thereof or a mixture thereof (B1), in a weight ratio of (B1)/(A) of from 0.01 to 0.50 based on the weights of the metal oxides, and have particle sizes of from 4.5 to 60 nm.

In the present invention, when stannic oxide is used for nuclei, a stable sol of modified stannic oxide colloidal particles can be obtained from step (a5): a step of preparing a stannic oxide aqueous sol containing stannic oxide colloidal particles having particle sizes of from 4 to 50 nm in a $SnO_2$ concentration of from 1 to 50 wt %, step (b5): a step of mixing the stannic oxide aqueous sol obtained in the above step (a5), with an aqueous medium containing composite colloidal particles of diantimony pentaoxide and silica having a $SiO_2/Sb_2O_5$ molar ratio of from 0.55 to 55, an oligomer thereof or a mixture thereof, in a weight ratio of $(Sb_2O_5+SiO_2)/SnO_2$ as calculated as metal oxides of from 0.01 to 0.50, and step (c5): a step of aging the aqueous medium obtained in step (b5) at a temperature of from 20 to 300° C. for from 0.1 to 50 hours.

The sol obtained in step (c5) may be further subjected to step (d5) when the stannic oxide sol obtained in step (a5) contains anions. Namely, a stable sol of modified stannic oxide colloidal particles can be obtained by further carrying out step (d5): a step of bringing the modified stannic oxide aqueous sol obtained in step (c5) with an anion exchanger to remove anions present in the sol, and aging the aqueous sol at a temperature of from 20 to 300° C. for from 0.1 to 50 hours. Aging at a temperature of at least 100° C. can be carried out by using an autoclave. This sol is a sol containing modified stannic oxide particles, which comprise, as nuclei, stannic oxide colloidal particles (A) having particle sizes of from 4 to 50 nm, and as a coating covering the surface of the nuclei, composite colloidal particles comprising diantimony pentaoxide and silica having a $SiO_2/Sb_2O_5$ molar ratio of from 0.55 to 55, an oligomer thereof or a mixture thereof (B2), in a weight ratio of (B2)/(A) of from 0.01 to 0.50 based on the weights of the metal oxides, and have particle sizes of from 4.5 to 60 nm.

Further, in the present invention, when composite colloidal particles of stannic oxide and zirconium oxide are used for nuclei, a stable sol of modified stannic oxide-zirconium oxide composite colloidal particles can be obtained by step (a6): a step of mixing a stannic oxide aqueous sol having particle sizes of from 4 to 50 nm and having a $SnO_2$ concentration of from 0.5 to 50 wt %, with an aqueous solution of an oxyzirconium salt having a concentration of from 0.5 to 50 wt % as calculated as $ZrO_2$, in a weight ratio of $ZrO_2/SnO_2$ of from 0.05 to 0.50, and heating the obtained mixed liquid at a temperature of from 60 to 100° C. for from 0.1 to 50 hours to prepare a stannic oxide-zirconium oxide composite aqueous sol having particle sizes of from 4 to 50 nm, step (b6): a step of mixing the stannic oxide-zirconium oxide aqueous composite sol obtained in step (a6), with an aqueous medium containing composite colloidal particles of diantimony pentaoxide and silica having a $SiO_2/Sb_2O_5$ molar ratio of from 0.55 to 55, an oligomer thereof or a mixture thereof, in a weight ratio of $(Sb_2O_5+SiO_2)/(SnO_2+ZrO_2)$ as calculated as metal oxides of from 0.01 to 0.50, step (c6): a step of aging the aqueous medium obtained in step (b6) at a temperature of from 20 to 300° C. for from 0.1 to 50 hours, and step (d6): a step of bringing the modified stannic oxide-zirconium oxide aqueous sol obtained in step (c6) into contact with an anion exchanger, and aging the aqueous sol at a temperature of from 20 to 300° C. for from 0.1 to 50 hours. Aging at a temperature of at least 100° C. can be carried out by using an autoclave. This sol is a sol containing modified composite colloidal particles comprising stannic oxide particles and zirconium oxide particles, which comprise, as nuclei, composite colloidal particles (A) comprising stannic oxide particles and zirconium oxide particles, containing these oxides in a weight ratio of $ZrO_2:SnO_2$ of from 0.05:1 to 0.50:1 and having particle sizes of from 4 to 50 nm, and as a coating covering the surface of the nuclei, composite colloidal particles comprising diantimony pentaoxide and silica having a $SiO_2/Sb_2O_5$ molar ratio of from 0.55 to 55, an oligomer thereof or a mixture thereof (B2), in a weight ratio of (B2)/(A) of from 0.01 to 0.50 based on the weights of the metal oxides, and have particle sizes of from 4.5 to 60 nm.

The above production process may be carried out under elevated pressure by using an autoclave.

Namely, in a process using a stannic oxide sol treated in an autoclave for nuclei, a modified stannic oxide aqueous sol can be obtained from step (a7): a step of preparing a stannic oxide aqueous sol subjected to a hydrothermal treatment at a temperature of from 100 to 300° C., and having particle sizes of from 4 to 50 nm and a $SnO_2$ concentration of from 0.5 to 50 wt %, step (b7): a step of mixing the stannic oxide aqueous sol obtained in the above step (a7), with an aqueous medium containing composite colloidal particles of diantimony pentaoxide and silica having a $SiO_2/Sb_2O_5$ molar ratio of from 0.55 to 55, an oligomer thereof or a mixture thereof, in a weight ratio of $(Sb_2O_5+SiO_2)/SnO_2$ as calculated as metal oxides of from 0.01 to 0.50, and step (c7): a step of aging the aqueous medium obtained in step (b7) at a temperature of from 20 to 300° C. for from 0.1 to 50 hours. The sol obtained in step (c7) may be further subjected to step (d7) when the stannic oxide sol obtained in step (a7) contains anions. Namely, a stable sol of modified stannic oxide colloidal particles can be obtained by further carrying out step (d7): a step of bringing the modified stannic oxide aqueous sol obtained in step (c7) into contact with an anion exchanger to remove anions present in the sol, and aging the aqueous sol at a temperature of from 20 to 300° C. for from 0.1 to 50 hours. This sol is a sol containing modified stannic oxide particles, which comprise, as nuclei, stannic oxide colloidal particles (A) having particle sizes of from 4 to 50 nm, and as a coating covering the surface of the nuclei, composite colloidal particles comprising diantimony pentaoxide and silica having a $SiO_2/Sb_2O_5$ molar ratio of from 0.55 to 55, an oligomer thereof or a mixture thereof (B2), in a weight ratio of (B2)/(A) of from 0.01 to 0.50 based on the weights of the metal oxides, and have particle sizes of from 4.5 to 60 nm.

Further, in a process of using an aqueous sol comprising composite particles comprising stannic oxide sol treated in an autoclave and zirconium oxide for nuclei, a stable sol of modified stannic oxide-zirconium oxide composite colloidal particles can be obtained by step (a8): a step of mixing a stannic oxide aqueous sol subjected to a hydrothermal treatment at a temperature of from 100 to 300° C., and having particle sizes of from 4 to 50 nm and a $SnO_2$ concentration of from 0.5 to 50 wt %, with an aqueous solution of an oxyzirconium salt having a concentration of from 0.5 to 50 wt % as calculated as $ZrO_2$, in a weight ratio of $ZrO_2/SnO_2$ of from 0.05 to 0.50, and heating the obtained mixed liquid at a temperature of from 60 to 100° C. for from 0.1 to 50 hours to prepare a stannic oxide-zirconium oxide composite aqueous sol having particle sizes of from 4 to 50 nm, step (b8): a step of mixing the aqueous stannic oxide-zirconium oxide composite sol obtained in step (a8), with an aqueous medium containing composite colloidal particles of diantimony pentaoxide and silica having a $SiO_2/Sb_2O_5$ molar ratio of from 0.55 to 55, an oligomer thereof or a mixture thereof, in a weight ratio of $(Sb_2O_5+SiO_2)/(SnO_2+ZrO_2)$ as calculated as metal oxides of from 0.01 to 0.50, step (c8): a step of aging the aqueous medium obtained in step (b8) at a temperature of from 20 to 300° C. for from 0.1 to 50 hours, and step (d8): a step of bringing the modified stannic oxide-zirconium oxide composite aqueous sol obtained in step (c8) into contact with an anion exchanger, and aging the aqueous sol at a temperature of from 20 to 300° C. for from 0.1 to 50 hours. This sol is a sol containing modified composite colloidal particles comprising stannic oxide particles and zirconium oxide particles, which comprise, as nuclei, composite colloidal particles (A) comprising stannic oxide particles and zirconium oxide particles, containing these oxides in a weight ratio of $ZrO_2:SnO_2$ of from 0.05:1 to 0.50:1 and having particle sizes of from 4 to 50 nm, and as a coating covering the surface of the nuclei, composite colloidal particles comprising diantimony pentaoxide and silica having a $SiO_2/Sb_2O_5$ molar ratio of from 0.55 to 55, an oligomer thereof or a mixture thereof (B2), in a weight ratio of (B2)/(A) of from 0.01 to 0.50 based on the weights of the metal oxides, and have particle sizes of from 4.5 to 60 nm.

The process for producing the sol of the present invention is classified into two cases, i.e. a case where particles used for nuclei are stannic oxide, and a case where the particles are a composite sol comprising stannic oxide and zirconium oxide. The sol in the former case has a rutile crystal structure, and one obtained by coating such a sol as a coating composition on a substrate and baking it has a high refractive index (refractive index of from 1.7 to 1.8 as calculated from a coating film) and excellent transparency. Further, the sol in the latter case provides, in addition to the performance of the former sol, excellent weather (light) resistance by employing zirconium oxide in combination.

Each of the above sols can be classified into a case where stannic oxide is not treated in an autoclave and a case where it is treated in an autoclave. The sol in the latter case provides excellent performance of the former, and further, a coating film obtained by coating each sol as a coating composition on a substrate and baking it has a high refractive index (refractive index of from 1.8 to 1.9 as calculated from the coating film).

The above modified stannic oxide-zirconium oxide composite colloidal particles can be observed by an electron microscope, and have particle sizes of from about 4.5 to about 60 nm. The sol obtained by the above mixing has a pH of from about 1 to about 9, and contains anions such as $Cl^-$, $NO_3^-$ or $CH_3COO^-$ derived from oxyzirconium salts used for modification in a large amount, and thus the colloidal particles have undergone microagglomeration, and the sol has low transparency.

By removing, in step (d), anions in the sol obtained by the above mixing, a stable sol of modified stannic oxide-zirconium oxide composite colloidal particles having a pH of from 3 to 11.5 and having favorable transparency can be obtained.

Removal of anions in step (d) may be carried out by treating the sol obtained by the above mixing with a hydroxyl group form anion exchange resin at a temperature of at most 100° C., preferably from room temperature (20° C.) to 60° C. The hydroxyl group form anion exchange resin may be commercially available, and preferred is a strongly acidic form such as Amberlite 410.

The treatment with a hydroxyl group form anion exchange resin in step (d) is carried out particularly preferably at a concentration of all the metal oxides of the sol obtained by mixing in step (c) of from 1 to 10 wt %.

In the production processes (a1 to d1), (a2 to d2), (a5 to d5) and (d6 to d6) employing a stannic oxide sol not subjected to a hydrothermal treatment (autoclave treatment) as a material, aging at a temperature of from 20 to 100° C. for from 0.1 to 200 hours may be carried out in step (c), or alternatively, it is possible to carry out a hydrothermal treatment at a temperature of from 100 to 300° C. for from 0.1 to 200 hours.

Further, in the production processes (a3 to d3), (a4 to d4), (a7 to d7) and (a8 to d8) employing a stannic oxide sol subjected to a hydrothermal treatment (autoclave treatment) as a material, aging at a temperature of from 20 to 100° C. for from 0.1 to 200 hours may be carried out in step (c), or alternatively, it is possible to carry out a hydrothermal treatment at a temperature of from 100 to 300° C. for from 0.1 to 200 hours.

The modified stannic oxide aqueous sol and the modified stannic oxide-zirconium oxide aqueous composite sol of the present invention preferably have a pH of from 1.5 to 11.5. If the pH exceeds 11.5, the $Sb_2O_5$ colloidal particles which cover the modified stannic oxide colloidal particles or the modified stannic oxide-zirconium oxide composite colloidal particles are likely to be dissolved in the liquid. Further, if the total concentration of all the metal oxides in the sol of the modified stannic oxide colloidal particles or the modified stannic oxide-zirconium oxide composite colloidal particles exceeds 60 wt %, such a sol tends to be unstable. The concentration preferred for an industrial product is at a level of from 10 to 50 wt %.

The modified metal oxide sol of the present invention may contain other optional components so long as the object of the present invention can be achieved. Particularly when an oxycarboxylic acid is contained in an amount of at most about 30 wt % to the total amount of all the metal oxides, a colloid having further improved performance such as dispersibility will be obtained.

When the modified metal oxide sol of the present invention is mixed with a silane coupling agent or a hydrolysate thereof to form a coating composition, a silane coupling agent or a hydrolysate thereof has a pH exhibiting weak acidity, and thus an oxycarboxylic acid may be added to the modified metal oxide sol of the present invention to preliminarily lower the pH. In such a case, the modified metal oxide sol has a pH of from about 4 to about 6. Accordingly, the compatibility between the modified metal oxide particles and the silane coupling component in the coating composition will improve, whereby coating characteristics and the storage stability of the coating composition will improve.

The oxycarboxylic acid to be used may, for example, be lactic acid, tartaric acid, citric acid, gluconic acid, malic acid or glycolic acid. Further, an alkali component may be contained, such as an alkali metal hydroxide of e.g. Li, Na, K, Rb or Cs, $NH_4$, an alkylamine such as ethylamine, triethylamine, isopropylamine or n-propylamine; an aralkylamine such as benzylamine; an alicyclic amine such as piperidine; or an alkanolamine such as monoethanolamine or triethanolamine. They may be used in combination as a mixture of two or more of them. Further, they may be used together with the above acid component in combination. They may be contained in an amount of at most about 30 wt % based on the total amount of all the metal oxides.

In order to further increase the sol concentration, the sol may be concentrated up to a level of 50 wt % by a conventional method such as an evaporation method or an ultrafiltration method. Further, in order to adjust the pH of the sol, the above alkali metal, organic base (amine), oxycarboxylic acid or the like may be added to the sol after the concentration. Particularly, a sol having a total concentration of the metal oxides of from 10 to 40 wt % is practically preferred. When an ultrafiltration method is employed as a concentration method, polyanions, ultrafine particles, etc. which coexist in the sol pass through an ultrafilter membrane together with water, whereby such polyanions, ultrafine particles, etc. which cause the sol to be unstable, can be removed from the sol.

When the modified metal oxide colloid obtained by the above mixing is an aqueous sol, an organosol can be obtained by replacing the aqueous medium in the aqueous sol with a hydrophilic organic solvent. This replacement can be obtained by a conventional method such as an evaporation method or an ultrafiltration method. The hydrophilic organic solvent may, for example, be a lower alcohol such as methyl alcohol, ethyl alcohol or isopropyl alcohol; a linear amide such as dimethylformamide or N,N'-dimethylacetamide; a cyclic amide such as N-methyl-2-pyrrolidone; or a glycol such as ethyl cellosolve or ethylene glycol.

The formula (I) for component (S) to be used for the coating composition of the present invention:

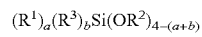  (I)

includes an organic silicon compound wherein $R^1$ and $R^3$ are the same organic groups or different organic groups, and a and b are the same integers or different integers. The organic silicon compound of the formula (I) for component (A) may, for example, be tetramethoxysilane, tetraethoxysilane, tetra n-propoxysilane, tetraisopropoxysilane, tetra n-butoxysilane, tetraacetoxysilane, methyltrimethoxysilane, methyltripropoxysilane, methyltriacetoxysilane, methyltributoxysilane, methyltripropoxysilane, methyltriamyloxysilane, methyltriphenoxysilane, methyltribenzyloxysilane, methyltriphenetyloxysilane, glycidoxymethyltrimethoxysilane, glycidoxymethyltriethoxysilane, α-glycidoxyethyltrimethoxysilane, α-glycidoxyethyltriethoxysilane, β-glycidoxyethyltrimethoxysilane, β-glycidoxyethyltriethoxysilane, α-glycidoxypropyltrimethoxysilane, α-glycidoxypropyltriethoxysilane, β-glycidoxypropyltrimethoxysilane, β-glycidoxypropyltriethoxysilane, γ-glycidoxypropyltrimethoxysilane, γ-glycidoxypropyltriethoxysilane, γ-glycidoxypropyltripropoxysilane, γ-glycidoxypropyltributoxysilane, γ-glycidoxypropyltriphenoxysilane, α-glycidoxybutyltrimethoxysilane, α-glycidoxybutyltriethoxysilane, β-glycidoxybutyltriethoxysilane, γ-glycidoxybutyltrimethoxysilane, γ-glycidoxybutyltriethoxysilane, δ-glycidoxybutyltrimethoxysilane, δ-glycidoxybutyltriethoxysilane, (3,4-epoxycyclohexyl) methyltrimethoxysilane, (3,4-epoxycyclohexyl) methyltriethoxysilane, β-(3,4-epoxycyclohexyl) ethyltrimethoxysilane, β-(3,4-epoxycyclohexyl) ethyltriethoxysilane, β-(3,4-epoxycyclohexyl) ethyltripropoxysilane, β-(3,4-epoxycyclohexyl) ethyltributoxysilane, β-(3,4-epoxycyclohexyl) ethyltriphenoxysilane, γ-(3,4-epoxycyclohexyl) propyltrimethoxysilane, γ-(3,4-epoxycyclohexyl) propyltriethoxysilane, δ-(3,4-epoxycyclohexyl) butyltrimethoxysilane, δ-(3,4-epoxycyclohexyl) butyltriethoxysilane, glycidoxymethylmethyldimethoxysilane, glycidoxymethylmethyldiethoxysilane, α-glycidoxyethylmethyldimethoxysilane, α-glycidoxyethylmethyldiethoxysilane, β-glycidoxyethylmethyldimethoxysilane, β-glycidoxyethylmethyldiethoxysilane, α-glycidoxypropylmethyldimethoxysilane, α-glycidoxypropylmethyldiethoxysilane, β-glycidoxypropylmethyldimethoxysilane, β-glycidoxypropylethyldimethoxysilane, γ-glycidoxypropylmethyldimethoxysilane, γ-glycidoxypropylmethyldiethoxysilane, γ-glycidoxypropylmethyldipropoxysilane, γ-glycidoxypropylmethyldibutoxysilane, γ-glycidoxypropylmethyldiphenoxysilane, γ-glycidoxypropylethyldimethoxysilane, γ-glycidoxypropylethyldiethoxysilane, γ-glycidoxypropylvinyldimethoxysilane, γ-glycidoxypropylvinyldiethoxysilane, ethyltrimethoxysilane, ethyltriethoxysilane, vinyltrimethoxysilane, vinyltriethoxysilane, vinyltriacetoxysilane, phenyltrimethoxysilane, phenyltriethoxysilane, phenyltriacetoxysilane, γ-chloropropyltrimethoxysilane, γ-chloropropyltriethoxysilane, γ-chloropropyltriacetoxysilane, 3,3,3-trifluoropropyltrimethoxysilane, γ-methacryloxypropyltrimethoxysilane, γ-mercaptopropyltrimethoxysilane, γ-mercaptopropyltriethoxysilane, β-cyanoethyltriethoxysilane, chloromethyltrimethoxysilane, chloromethyltriethoxysilane, N-(β-aminoethyl) γ-aminopropyltrimethoxysilane, N-(β-aminoethyl) γ-aminopropylmethyldimethoxysilane, γ-aminopropylmethyldimethoxysilane, N-(β-aminoethyl) γ-aminopropyltriethoxysilane, N-(β-aminoethyl) γ-aminopropylmethyldiethoxysilane, dimethyldimethoxysilane, phenylmethyldimethoxysilane, dimethyldiethoxysilane, phenylmethyldiethoxysilane, γ-chloropropylmethyldimethoxysilane, γ-chloropropylmethyldiethoxysilane, dimethyldiacetoxysilane, γ-methacryloxypropylmethyldimethoxysilane, γ-methacryloxypropylmethyldiethoxysilane, γ-mercaptopropylmethyldimethoxysilane, γ-mercaptomethyldiethoxysilane, methylvinyldimethoxysilane, or methylvinyldiethoxysilane. These organic silicon compounds may be used alone or in combination as a mixture of two or more of them.

The hydrolysates of organic silicon compounds of the formula (I) for component (S) to be used for the coating composition of the present invention, are compounds obtained by hydrolysis of the organic silicon compounds of the formula (I) so that a part or all of $R^2$ are substituted by hydrogen atoms. Such hydrolysates of the organic silicon compounds of the formula (I) may be used alone or in combination as a mixture of two or more of them. The hydrolysis is carried out by adding an aqueous acidic solution such as an aqueous hydrochloric acid solution, an aqueous sulfuric acid solution or an aqueous acetic acid solution to the organic silicon compound, followed by stirring.

The organic silicon compound of the formula (II):

$$[(R^4)_c Si(OX)_{3-c}]_2 Y \qquad (II)$$

for component (S) to be used for the coating composition of the present invention, may, for example, be methylenebismethyldimethoxysilane, ethylenebisethyldimethoxysilane, propylenebisethyldiethoxysilane or butylenebismethyldiethoxysilane. These organic silicon compounds may be used alone or in combination as a mixture of two or more of them.

The hydrolysates of organic silicon compounds of the formula (II) for component (S) to be used for the coating composition of the present invention, are compounds obtained by hydrolysis of the organic silicon compounds of the formula (II) so that a part or all of X are substituted by hydrogen atoms. Such hydrolysates of the organic silicon compounds of the formula (II) may be used alone or in combination as a mixture of two or more of them. The hydrolysis is carried out by adding an aqueous acidic solution such as an aqueous hydrochloric acid solution, an aqueous sulfuric acid solution or an aqueous acetic acid solution to the organic silicon compound, followed by stirring.

Component (S) to be used for the coating composition of the present invention, is at least one silicon-containing substance selected from the group consisting of organic silicon compounds of the formulae (I) and (II) and their hydrolysates.

Component (S) to be used for the coating composition of the present invention, is preferably at least one silicon-containing substance selected from the group consisting of organic silicon compounds of the formula (I) and their hydrolysates. Particularly preferred are organic silicon compounds of the formula (I) wherein either one of $R^1$ and $R^3$ is an organic group having an epoxy group, $R^2$ is an alkyl group, and each of a and b is 0 or 1, provided that a+b is 1 or 2, and their hydrolysates. Examples of such preferred organic silicon compounds include glycidoxymethyltrimethoxysilane, glycidoxymethyltriethoxysilane, α-glycidoxyethyltrimethoxysilane, α-glycidoxyethyltriethoxysilane, β-glycidoxyethyltrimethoxysilane, β-glycidoxyethyltriethoxysilane, α-glycidoxypropyltrimethoxysilane, α-glycidoxypropyltriethoxysilane, β-glycidoxypropyltrimethoxysilane, β-glycidoxypropyltriethoxysilane, γ-glycidoxypropyltrimethoxysilane, γ-glycidoxypropyltriethoxysilane, γ-glycidoxypropyltripropoxysilane, γ-glycidoxypropyltributoxysilane, γ-glycidoxypropyltriphenoxysilane, α-glycidoxybutyltrimethoxysilane, α-glycidoxybutyltriethoxysilane, β-glycidoxybutyltriethoxysilane, γ-glycidoxybutyltrimethoxysilane, γ-glycidoxybutyltriethoxysilane, δ-glycidoxybutyltrimethoxysilane, δ-glycidoxybutyltriethoxysilane, glycidoxymethylmethyldimethoxysilane, glycidoxymethylmethyldiethoxysilane, α-glycidoxyethylmethyldimethoxysilane, α-glycidoxyethylmethyldiethoxysilane, β-glycidoxyethylmethyldimethoxysilane, β-glycidoxyethyldimethoxysilane, α-glycidoxypropylmethyldimethoxysilane, α-glycidoxypropylmethyldiethoxysilane, β-glycidoxypropylmethyldimethoxysilane, β-glycidoxypropylethyldimethoxysilane, γ-glycidoxypropylmethyldimethoxysilane, γ-glycidoxypropylmethyldiethoxysilane, γ-glycidoxypropylmethyldipropoxysilane, γ-glycidoxypropylmethyldibutoxysilane, γ-glycidoxypropylmethyldiphenoxysilane, γ-glycidoxypropylethyldimethoxysilane, γ-glycidoxypropylethyldiethoxysilane, γ-glycidoxypropylvinyldimethoxysilane, and γ-glycidoxypropylvinyldiethoxysilane.

More preferred are γ-glycidoxypropyltrimethoxysilane, γ-glycidoxypropylmethyldiethoxysilane, γ-glycidoxypropylmethyldimethoxysilane and their hydrolysates, and they may be used alone or in combination as a mixture. Further, γ-glycidoxypropyltrimethoxysilane, γ-glycidoxypropylmethyldiethoxysilane, γ-glycidoxypropylmethyldimethoxysilane or a hydrolysate thereof may be used in combination with a tetrafunctional compound of the formula (I) wherein a+b=0. Examples of the tetrafunctional compound include tetramethoxysilane, tetraethoxysilane, tetraisopropoxysilane, tetra n-propoxysilane, tetra n-butoxysilane, tetra tert-butoxysilane and tetra sec-butoxysilane.

The modified metal oxide particles to be used for component (T1) and component (T2) in the coating composition of the present invention may be any one of the modified sols as defined in the above 1 to 6.

The coating composition of the present invention is obtained by blending component (T1) or (T2) in a proportion of preferably from 1 to 500 parts by weight, particularly preferably from 50 to 250 parts by weight, with 100 parts by weight of component (S). Namely, the coating composition preferably contains 100 parts by weight of component (S): an organic silicon compound and from 1 to 500 parts by weight of component (T1): modified metal oxide particles, which comprise, as nuclei, colloidal particles (A) being stannic oxide particles or composite particles comprising stannic oxide particles and zirconium oxide particles, containing these oxides in a weight ratio of $ZrO_2:SnO_2$ of from 0:1 to 0.50:1 and having particle sizes of from 4 to 50 nm, and as a coating covering the surface of the nuclei, alkylamine-containing $Sb_2O_5$ colloidal particles having a $M/Sb_2O_5$ molar ratio (M represents an amine molecule) of from 0.02 to 4.00, an oligomer thereof or a mixture thereof (B1), in a weight ratio of (B1)/(A) of from 0.01 to 0.50 based on the weights of the metal oxides, and have particle sizes of from 4.5 to 60 nm. If the amount of the modified metal oxide sol is less than 1 part by weight, a cured film to be obtained will have a low refractive index, and its application to a substrate will be remarkably limited. Further, if it exceeds 500 parts by weight, cracks or the like are likely to occur between the cured film and the substrate, and there is high possibility that the transparency decreases.

The coating composition of the present invention is obtained by blending component (T1) or (T2) in a proportion of preferably from 1 to 500 parts by weight, particularly preferably from 50 to 250 parts by weight, with 100 parts by weight of component (S). Namely, the coating composition preferably contains 100 parts by weight of component (S): an organic silicon compound and from 1 to 500 parts by weight of component (T2): modified metal oxide particles, which comprise, as nuclei, colloidal particles (A) being stannic oxide particles or composite particles comprising stannic oxide particles and zirconium oxide particles, containing these oxides in a weight ratio of $ZrO_2:SnO_2$ of from 0:1 to 0.50:1 and having particle sizes of from 4 to 50 nm, and as a coating covering the surface of the nuclei, composite colloidal particles comprising diantimony pentaoxide and silica having a $SiO_2/Sb_2O_5$ molar ratio of from 0.55 to 55, an oligomer thereof or a mixture thereof (B2), in a weight ratio of (B2)/(A) of from 0.01 to 0.50 based on the weights of the metal oxides, and have particle sizes of from 4.5 to 60 nm. If the amount of the modified metal oxide sol is less than 1 part by weight, a cured film to be obtained will have a low refractive index, and its application to a substrate will be remarkably limited. Further, if it exceeds 500 parts by weight, cracks or the like are likely to occur between the cured film and the substrate, and there is high possibility that the transparency decreases.

To the coating composition of the present invention, a curing agent may be incorporated so as to accelerate the reaction, fine particulate of a metal oxide may be incorporated so as to adjust the refractive index with lenses to be various substrates, or a surface active agent may be incorporated so as to improve wettability at the time of coating and to improve smoothness of the cured film. Further, e.g. an ultraviolet absorber or an antioxidant may be added within a range of not impairing physical properties of the cured film.

The curing agent may, for example, be an amine such as allylamine or ethylamine, a salt or a metal salt having an acid or a base including a Lewis acid or a Lewis base, such as organic carboxylic acid, chromic acid, hypochlorous acid, boric acid, perchloric acid, bromic acid, selenious acid, thiosulfuric acid, orthosilicic acid, thiocyanic acid, nitrous acid, aluminic acid or carbonic acid, or an alkoxide or chelate of a metal such as aluminum, zirconium or titanium.

Further, the fine particulate metal oxide may, for example, be fine particles of e.g. aluminum oxide, titanium oxide, antimony oxide, zirconium oxide, silicon oxide or cerium oxide.

The coating composition of the present invention may be coated on a substrate and cured to obtain a cured film. Curing of the coating composition is carried out by hot air drying or irradiation with active energy rays. As the curing conditions, curing is preferably carried out in a hot air of from 70 to 200° C., particularly preferably from 90 to 150° C. As the active energy rays, far infrared rays may be used, whereby damage due to heat can be suppressed to a low level.

The coating composition of the present invention may be coated on a substrate and cured to obtain a cured film. Further, in the present invention, an optical element which has a laminate film comprising a cured film made of the above coating composition, a shock absorbing film and an antireflection film on its surface, can be obtained.

As a method of forming the cured film made of the coating composition of the present invention on a substrate, the above method of coating the coating composition on a substrate, may be mentioned. As a coating means, a conventional method such as a dipping method, a spin coating method or a spray coating method may be employed. However, a dipping method or a spin coating method is particularly preferred from the viewpoint of the area degree.

Further, adhesion between the substrate and the cured film may be improved by applying chemical treatment by means of an acid, an alkali or various organic solvents, physical treatment by means of plasma or ultraviolet rays, washing treatment by means of various washing agents or primer treatment by means of various resins, prior to coating the above coating composition on the substrate.

It is also possible to add the modified metal oxide particles disclosed as component (T1) or (T2) as a refractive index adjusting agent to the above various resins for primer.

Further, an antireflection film of vapor deposition film of an inorganic oxide to be formed on the cured film made of the coating composition of the present invention is not particularly limited, and a conventionally known single-layer or multilayer antireflection film of a vapor deposition film of an inorganic oxide may be used. Examples of the antireflection film include antireflection films as disclosed in JP-A-2-262104 and JP-A-56-116003.

The shock absorbing film will improve a shock resistance. The shock absorbing film is made of a polyacrylic acid resin, polyvinyl acetate resin, or polyvinyl alcohol resin, etc.

Further, the cured film made of the coating composition of the present invention is useful as an antireflection film as a high refractive index film. Further, by incorporating a functional component for e.g. antifogging, photochromic or stain proofing, it may also be used as a multifunctional film.

The optical element having the cured film made of the coating composition of the present invention is useful as not only lenses for eyeglasses, but also lenses for cameras, window glasses for automobiles and optical filters for liquid crystal display or plasma display devices.

EXAMPLES

Preparation of Nucleus Sol

A-1-1 Preparation of Stannic Oxide Sol 41 kg of 35% hydrochloric acid and 110 kg of pure water were put in a 0.5 m$^3$ reactor lined with glass (a reactor the inner surface of which was covered with glass) and heated to 70° C. with stirring, and then with cooling, 185 kg of a 35% hydrogen peroxide solution and 90 kg of a metal tin powder (manufactured by YAMAISHI METALS CO., LTD., AT-Sn No. 200N, containing 99.7% as $SnO_2$) were alternately added dividedly 18 times in total. Addition of the hydrogen peroxide solution and the metal tin was carried out as follows. Firstly, 10 kg of the 35% hydrogen peroxide solution was gradually added and then 5 kg of the metal tin was gradually added, and after the completion of the reaction (10 to 15 minutes), addition of the hydrogen peroxide and the metal tin was repeated. Since the reaction was an exothermic reaction, the temperature increased to from 90 to 95° C. by addition of the metal tin. Accordingly, the reaction temperature was from 70 to 95° C. The ratio of the hydrogen peroxide to the metal tin was 2.5 as the $H_2O_2$/Sn molar ratio. The time required for addition of the hydrogen peroxide solution and the metal tin was 4.5 hours. After the completion of the reaction, aging was carried out by keeping the liquid temperature to from 90 to 95° C. for 0.5 hour. The Sn/Cl equivalent ratio at the time of reaction was 1.92.

After the completion of the aging, stirring was stopped, and the reaction product was cooled and left to stand overnight, whereby tin oxide colloidal aggregate settled down, and the reaction liquid was separated into two layers i.e. a supernatant layer and a sediment layer. The supernatant fluid was transparent and exhibited substantially no colloidal color. The supernatant fluid was removed by a gradient method. The weight of the supernatant fluid was 205 kg. 125 kg of water was added to the remaining tin oxide colloidal aggregate slurry, followed by stirring at 30° C. for 4 hours, whereby the tin oxide colloidal aggregate was peptized to form a tin oxide sol.

The weight of the obtained tin oxide sol was 340 kg. The sol was a pale yellow transparent sol. The particle sizes of the tin oxide colloid were at most 10 nm as observed by an electron microscope. It was stable even after left to stand at room temperature for at least 1 year.

322 kg of the pale yellow stannic oxide sol was dispersed in 2,118 kg of water, and 2.42 kg of isopropylamine was added thereto, followed by aging by heating at a temperature of from 80 to 85° C. for 3 hours. After cooling, the liquid was applied to a column packed with a hydroxyl group form anion exchange resin to obtain 2,175 kg of an alkaline stannic oxide aqueous sol. The sol was stable, had very high transparency although exhibited a colloidal color, and had a specific gravity of 1.032, a pH of 10.01, a $SnO_2$ content of 4.14 wt %, and an isopropylamine content of 0.11 wt %.

A-1-2 Preparation of Stannic Oxide Sol 37.5 kg of oxalic acid $((COOH)_2.2H_2O)$ was dissolved in 220 kg of pure water, and the solution was put in a 0.5 m$^3$ reactor lined with glass (a reactor the inner surface of which was covered with glass) and heated to 70° C. with stirring, and then 150 kg of a 35% hydrogen peroxide solution and 75 kg of a metal tin powder (manufactured by YAMAISHI METALS CO., LTD., AT-Sn No. 200N, containing 99.7% as $SnO_2$) were added thereto. The hydrogen peroxide solution and the metal tin were alternately added dividedly in 15 times. Firstly, 10 kg of the 35% hydrogen peroxide solution was added, and then 5 kg of the metal tin was added. After the completion of the reaction (10 to 15 minutes), the above operation was repeated.

The time required for addition was 2.5 hours, and after completion of the addition, the liquid was heated for 1 hour while keeping the liquid temperature at 90° C., and the reaction was completed. The ratio of the hydrogen peroxide to the metal tin was 2.44 as the $H_2O_2$/Sn molar ratio. The yield of the obtained tin oxide sol was 352 kg, and the sol had a specific gravity of 1.22, a pH of 1.49, a $SnO_2$ concentration of 26.1 wt %, an oxalic acid concentration based on the charged amount of 7.6 wt %, and a $(COOH)_2/SnO_2$ molar ratio of 0.47. The obtained sol had thixotropic properties but had lower thixotropic properties than those when a hydrochloric acid aqueous solution was used.

The tin oxide colloidal particles had particle sizes of from 10 to 15 nm as observed by an electron microscope, and were spherical particles with favorable dispersibility. The sol tends to thicken when left to stand, however, the sol did not gelate and was stable after left to stand at room temperature for 6 months.

230 kg of this pale yellow stannic oxide sol was dispersed in 1,100 kg of water, 3.0 kg of isopropylamine was added thereto, and the resulting liquid was passed through a column packed with a hydroxyl group form anion exchange resin to make the liquid alkaline, and then the sol was aged by heating at 90° C. and then passed through a column packed with an anion exchange resin again to obtain 1,431 kg of an alkaline stannic oxide aqueous sol. The obtained sol was a stable stannic oxide sol having a very high transparency, and having a specific gravity of 1.034, a pH of 11.33, a $SnO_2$ content of 4.04 wt % and an isopropylamine content of 0.21 wt %.

A-1-3 Preparation of Stannic Oxide Sol by Treatment in an Autoclave 2,300 g of the alkaline stannic oxide aqueous sol obtained in A-1-1 was aged by heating in an autoclave at 140° C. for 5 hours.

A-1-4 Preparation of Stannic Oxide Sol by Treatment in an Autoclave 800 kg of the alkaline stannic oxide sol obtained in A-1-2 was aged by heating in an autoclave at 140° C. for 5 hours.

A-1-5 Preparation of Stannic Oxide Sol by Treatment in an Autoclave 600 kg of the alkaline stannic oxide sol obtained in A-1-2 was aged by heating in an autoclave at 240° C. for 5 hours.

B. Preparation of Coating Materials

B-1-1 Preparation of Alkali Component-Containing Diantimony Pentoxide Colloid Into a 500 ml four-necked flask, 52.6 g of diantimony trioxide (manufactured by Kanton Mikuni, containing 99.5% as $Sb_2O_3$), 444 g of pure water and 40.2 g of diisopropylamine were added and heated to 70° C. with stirring with a stirrer, and 53 g of a 35% hydrogen peroxide solution was gradually added thereto. After the completion of the reaction, the reaction mixture was subjected to filtration with a glass filter paper (GA-100, manufactured by ADVANTEC). The obtained aqueous medium containing alkali component-containing diantimony pentoxide colloid and an oligomer thereof, had a $Sb_2O_5$ concentration of 9.8 wt %, a diisopropylamine concentration of 6.8 wt %, and a molar ratio of diisopropylamine/$Sb_2O_5$ of 2.2, and particles of at most 10 nm were observed by a transmission electron microscope.

B-1-2 Preparation of Alkali Component-Containing Diantimony Pentoxide Colloid Into a 100 ml vessel, 12.5 kg of diantimony trioxide (manufactured by Kanton Mikuni, containing 99.5% as $Sb_2O_3$), 66.0 kg of pure water and 12.5 kg of potassium hydroxide (containing 95% as KOH) were added, and 8.4 kg of a 35% hydrogen peroxide solution was gradually added thereto with stirring. The obtained potassium antimonate aqueous solution had a $Sb_2O_5$ concentration of 15.25 wt %, a potassium hydroxide concentration of 5.36 wt %, and a molar ratio of $K_2O/Sb_2O_5$ of 1.0.

The obtained potassium antimonate aqueous solution was diluted to 2.5 wt %, and passed through a column packed with a hydrogen form cation exchange resin. To the solution of antimonic acid after the ion exchange, 6.6 kg of diisopropylamine was added with stirring, to obtain an aqueous medium containing alkali component-containing diantimony pentoxide colloid and an oligomer thereof. The aqueous medium had a $Sb_2O_5$ concentration of 1.8 wt %, a diisopropylamine concentration of 1.2 wt %, a molar ratio of diisopropylamine/$Sb_2O_5$ of 1.69, and particles of at most 10 nm were observed by a transmission electron microscope.

B-2-1 Preparation of Diantimony Pentaoxide-Silica Composite Colloid 546 g of a potassium silicate aqueous solution (containing 15.4 wt % as $SiO_2$) was diluted with 542 g of pure water, and a potassium antimonate aqueous solution (containing 14.6 wt % as $Sb_2O_5$) was mixed therewith with stirring and stirring, was continued for 1 hour to obtain a mixed aqueous solution of potassium silicate and potassium antimonate.

The obtained mixed aqueous solution of potassium silicate and potassium antimonate was diluted with pure water to a concentration of 5 wt %, and then the diluted solution was passed through a column packed with a cation exchange resin to obtain an aqueous medium containing a diantimony pentaoxide-silica composite colloid and an oligomer thereof.

The obtained composite colloid was colorless and transparent and had a pH of 1.8, and particles of at most 5 nm were observed by a transmission electron microscope.

Example 1

For Preparation of Modified Metal Oxide Sol

Step (a): An alkaline stannic oxide aqueous sol (A-1-1) having particle sizes of at most 10 nm and an $SnO_2$ concentration of 4.14 wt % was obtained.

Step (b): 51.0 g of the aqueous medium containing an amine component-containing diantimony pentaoxide colloid and an oligomer thereof prepared in B-1-1 was added to 1,207.7 g (containing 50 g as $SnO_2$) of the aqueous sol obtained in A-1-1 with stirring, and they were mixed in a weight ratio of (B-1-1)/(A-1-1) as calculated as metal oxides of 0.1.

Step (c): The aqueous medium obtained in Step (b) was aged by heating at 90° C. for 3 hours.

The obtained modified stannic oxide aqueous sol (diluted liquid) was concentrated by a filtration apparatus with an ultrafilter membrane with a molecular weight cutoff of 50,000 at room temperature to obtain 270 g of a high concentration modified stannic oxide aqueous sol. This sol had a specific gravity of 1.220, a pH of 7.90, a viscosity of 2.3 c.p. and a concentration of 20.3 wt % as calculated as metal oxides, and was stable.

While 9 liters of methanol was gradually added to 246 g of the above high concentration modified stannic oxide aqueous sol, water was distilled off by a rotary evaporator under reduced pressure at a liquid temperature of at most 30° C., to obtain 159 g of a modified stannic oxide methanol sol having water in the aqueous sol replaced with methanol. This sol had a specific gravity of 1.092, a pH of 7.70 (mixture with water in an equal weight), a viscosity of 2.3 c.p., a concentration of 30.5 wt % as calculated as metal oxides, a water content of 0.65 wt %, and particle sizes of from 5 to 15 nm as observed by an electron microscope. This sol showed a colloidal color and had a high transparency, and it was free from e.g. precipitates, white turbidity and thickening and was stable even after left to stand at room temperature for 3 months. Further, the dry product of this sol had a refractive index of 1.76.

Example 2

For Preparation of Modified Metal Oxide Sol

The same operation as in Preparation Example 1 was carried out except that 51 g of the aqueous medium containing an alkali component-containing diantimony pentaoxide colloid and an oligomer thereof as the component B-1-1 in Preparation Example 1 was changed to 277.8 g of the aqueous medium containing an alkali component-containing diantimony pentaoxide colloid and an oligomer thereof as the component B-1-2 so that the weight ratio of (B)/(A) as calculated as metal oxides would be 0.1.

The obtained high concentration modified stannic oxide aqueous sol had a specific gravity of 1.218, a pH of 8.80, a viscosity of 2.8 c.p. and a concentration of 20.4 wt % as calculated as metal oxides, and was stable.

While 10 liters of methanol was gradually added to 245 g of the above high concentration modified stannic oxide aqueous sol, water was distilled off by a rotary evaporator under reduced pressure at a liquid temperature of at most 30° C. to obtain 162 g of a modified stannic oxide methanol sol having water in the aqueous sol replaced with methanol. This sol had a specific gravity of 1.093, a pH of 8.34 (mixture with water in an equal weight), a viscosity of 1.8 c.p., a concentration of 30.5 wt % as calculated as metal oxides, a water content of 0.81 wt % and particle sizes of from 5 to 15 nm as observed by an electron microscope. This sol showed a colloidal color and had a high transparency, and it was free from e.g. precipitates, while turbidity and thickening and was stable, even after left to stand at room temperature for 3 months. Further, the dried product of this sol had a refractive index of 1.76.

Example 3

For Preparation of Modified Metal Oxide Sol

The same operation as in Preparation Example 1 was carried out except that the stannic oxide colloid as the component A-1-1 in Preparation Example 1 was changed to 1,207.7 g of the stannic oxide colloid as the component A-1-3, and the aqueous medium containing an alkali component-containing diantimony pentaoxide colloid and an oligomer thereof as the component B-1-1 was changed to 277.8 g of the aqueous medium containing an alkali component-containing antimony pentaoxide colloid and an oligomer thereof as the component B-1-2 so that the weight ratio of (B)/(A) as calculated as metal oxides would be 0.1.

The obtained high concentration modified stannic oxide aqueous sol had a specific gravity of 1.220, a pH of 8.51, a viscosity of 2.4 c.p. and a concentration of 21.2 wt % as calculated as metal oxides, and was stable.

While 8 liters of methanol was gradually added to 236 g of the above high concentration modified stannic oxide aqueous sol, water was distilled off by a rotary evaporator under reduced pressure at a liquid temperature of at most 30° C. to obtain 160 g of a modified stannic oxide methanol sol having water in the aqueous sol replaced with methanol. This sol had a specific gravity of 1.092, a pH of 8.0 (mixture with water in an equal weight), a viscosity of 1.2 c.p., a concentration of 30.5 wt % as calculated as metal oxides, a water content of 0.75 wt % and particle sizes of from 5 to 15 nm as observed by an electron microscope. This sol showed a colloidal color and had a high transparency, and it was free from e.g. precipitates, white turbidity and thickening and was stable, even after left to stand at room temperature for 3 months. Further, the dried product of this sol had a refractive index of 1.87.

Example 4

For Preparation of Modified Metal Oxide Sol

The same operation as in Preparation Example 1 was carried out except that the stannic oxide colloid as the component A-1-1 in Preparation Example 1 was changed to 1,237.7 g of the stannic oxide colloid as the component A-1-3, and the aqueous medium containing an alkali component-containing diantimony pentaoxide colloid and an oligomer thereof as the component B-1-1 was changed to 277.8 g of the aqueous medium containing an alkali component-containing diantimony pentaoxide colloid and an oligomer thereof as the component B-1-2 so that the weight ratio of (B)/(A) as calculated as metal oxides would be 0.1.

The obtained high concentration modified stannic oxide aqueous sol had a specific gravity of 1.226, a pH of 7.92, a viscosity of 3.1 c.p. and a concentration of 22.0 wt % as calculated as metal oxides, and was stable.

While 9 liters of methanol was gradually added to 227 g of the above high concentration modified stannic oxide aqueous sol, water was distilled off by a rotary evaporator under reduced pressure at a liquid temperature of at most 30° C. to obtain 160 g of a modified stannic oxide methanol sol having water in the aqueous sol replaced with methanol. This sol had a specific gravity of 1.084, a pH of 8.0 (mixture with water in an equal weight), a viscosity of 1.1 c.p., a concentration of 30.5 wt % as calculated as metal oxides, a water content of 0.68 wt % and particle sizes of from 10 to 15 nm as observed by an electron microscope. This sol showed a colloidal color and had a high transparency, and it was free from e.g. precipitates, white turbidity and thickening and was stable, even after left to stand at room temperature for 3 months. Further, the dried product of this sol had a refractive index of 1.92.

Example 5

For Preparation of Modified Metal Oxide Sol

Step (a): 500 kg of pure water was added to 9.16 kg (containing 1.62 kg as calculated as $ZrO_2$) of a zirconium oxychloride aqueous solution (containing 17.68 wt % as calculated as $ZrO_2$) having zirconium oxychloride ($ZrOCl_2.8H_2O$) dissolved in pure water with stirring, 0.40 kg of 35% hydrochloric acid was further added, and then 270 kg (containing 10.8 kg as $SnO_2$) of the alkaline stannic oxide aqueous sol prepared in A-1-2 was added, and stirring was continued for 10 minutes. The mixed liquid was a sol having a $ZrO_2/SnO_2$ weight ratio of 0.15, showing a colloidal color and having favorable transparency. The prepared mixed liquid was subjected to a heat treatment at 95° C. for 5 hours with stirring to obtain 779.2 kg of a stannic oxide-zirconium oxide composite sol. This sol had an $SnO_2$ concentration of 1.38 wt %, a $ZrO_2$ concentration of 0.21 wt % and a concentration of $SnO_2$+$ZrO_2$ of 1.59 wt %.

Step (b): 779.2 kg of the stannic oxide-zirconium oxide composite sol obtained in Step (a) was gradually added with stirring to 68.83 kg (containing 1.24 kg as calculated as $Sb_2O_5$) of the aqueous medium containing an amine-containing diantimony pentaoxide colloid and an oligomer thereof obtained in B-1-2 and mixed in a ratio of $Sb_2O_5/(SnO_2+ZrO_2)$ =0.1.

Step (c): The aqueous medium obtained in Step (b) was stirred at a temperature of from 20 to 30° C. for 1 hour.

Step (d): The mixed sol-like slurry obtained in Step (c) was passed through a column packed with a hydroxyl group form anion exchange resin to remove anion (Cl⁻) contained in the sol. Then, the sol was aged by heating at a temperature of from 90 to 95° C. for from 2 to 3 hours to obtain a modified stannic oxide-zirconium oxide composite sol. This sol was a sol having a specific gravity of 1.011, a viscosity of 2.9 c.p. and a pH of 10.58 and having favorable transparency.

The obtained modified stannic oxide-zirconium oxide composite aqueous sol (diluted liquid) was concentrated by a filtration apparatus with an ultrafilter membrane with a molecular weight cutoff of 100,000 to obtain 64.7 kg of a high concentration modified stannic oxide-zirconium oxide composite aqueous sol. This sol had a specific gravity of 1.233, a viscosity of 4.8 c.p., a pH of 9.75 and a total metal oxide concentration of 22.1 wt % and was stable.

While 1,200 kg of methanol was gradually added to 50 g of the above high concentration modified stannic oxide-zirconium oxide composite aqueous sol, water was distilled off by a rotary evaporator under reduced pressure at a liquid temperature of at most 30° C. to obtain 30.8 kg of a modified stannic oxide-zirconium oxide composite methanol sol having water in the aqueous sol replaced with methanol. This sol was subjected to filtration to adjust the concentration, and the obtained modified stannic oxide-zirconium oxide composite methanol sol had particle sizes of 12 nm as observed by an electron microscope, a specific gravity of 1.086, a viscosity of 3.2 c.p., a pH of 8.81 (mixture with water in an equal weight), a concentration of 30.4 wt % as calculated as metal oxides, and a water content of 0.37 wt %. This sol showed a colloidal color and had a high transparency, and it was free from e.g. precipitates, white turbidity and thickening and was stable, even after left to stand at room temperature for 3 months. Further, this sol had a refractive index of 1.87.

Example 6

For Preparation of Modified Metal Oxide Sol

Step (a): 500 kg of pure water was added to 13.6 kg (containing 2.4 kg as calculated as $ZrO_2$) of a zirconium oxychloride aqueous solution (containing 17.68 wt % as calculated as $ZrO_2$) having zirconium oxychloride ($ZrOCl_2.8H_2O$) dissolved in pure water with stirring, 0.59 kg of 35% hydrochloric acid was further added, and then 396 kg (containing 16.0 kg as $SnO_2$) of the alkaline stannic oxide aqueous sol prepared in A-1-4 was added, and stirring was continued for 10 minutes. The mixed liquid was a sol having a $ZrO_2/SnO_2$ weight ratio of 0.15 and a pH of 1.72, showing a colloidal color and having favorable transparency. The prepared mixed liquid was subjected to a heat treatment at 95° C. for 5 hours with stirring to obtain 910.2 kg of a stannic oxide-zirconium oxide composite sol. This sol had an $SnO_2$ concentration of 1.75 wt %, a $ZrO_2$ concentration of 0.26 wt % and a concentration of $SnO_2+ZrO_2$ of 2.01 wt %.

Step (b): 910.2 kg of the stannic oxide-zirconium oxide composite sol obtained in Step (a) was gradually added with stirring to 102 kg (1.84 kg as $Sb_2O_5$) of the aqueous medium containing an amine-containing diantimony pentaoxide colloid and an oligomer thereof obtained in B-1-2 and mixed in a weight ratio of $Sb_2O_5/(SnO_2+ZrO_2)=0.1$.

Step (c): The aqueous medium obtained in Step (b) was stirred at a temperature of from 20 to 30° C. for 1 hour.

Step (d): The mixed sol-like slurry obtained in Step (c) was passed through a column packed with a hydroxyl group form anion exchange resin to remove anion ($Cl^-$) contained in the sol. Then, the sol was aged by heating at a temperature of from 90 to 95° C. for from 2 to 3 hours to obtain a modified stannic oxide-zirconium oxide composite sol.

The mixed sol-like slurry obtained in Step (c) was passed through a column packed with a hydroxyl group form anion exchange resin in step (d) to remove anions ($Cl^-$) contained in the sol. Then, the sol was aged by heating at a temperature of from 90 to 95° C. for from 2 to 3 hours to obtain a modified stannic oxide-zirconium oxide composite sol. This sol was a sol having a specific gravity of 1.012, a viscosity of 3.0 c.p. and a pH of 10.78 and having favorable transparency.

The obtained modified stannic oxide-zirconium oxide composite aqueous sol (diluted liquid) was concentrated by a filtration apparatus with an ultrafilter membrane with a molecular weight cutoff of 100,000 to obtain 69.5 kg of a high concentration modified stannic oxide-zirconium oxide composite aqueous sol. This sol had a specific gravity of 1.284, a viscosity of 5.0 c.p., a pH of 10.19 and a total metal oxide concentration of 26.1 wt % and was stable.

While 1,255 kg of methanol was gradually added to 50 kg of the above high concentration modified stannic oxide-zirconium oxide composite aqueous sol, water was distilled off by a rotary evaporator under reduced pressure at a liquid temperature of at most 30° C. to obtain 36.9 kg of a modified stannic oxide-zirconium oxide composite methanol sol having water in the aqueous sol replaced with methanol. This sol was subjected to filtration to adjust the concentration, and the obtained modified stannic oxide-zirconium oxide composite methanol sol had particle sizes of 13 nm as observed by an electron microscope, a specific gravity of 1.086, a viscosity of 4.2 c.p., a pH of 8.92 (mixture with water in an equal weight), a concentration of 30.3 wt % as calculated as metal oxides, and a water content of 0.33 wt %. This sol showed a colloidal color and had a high transparency, and it was free from e.g. precipitates, white turbidity and thickening and was stable, even after left to stand at room temperature for 3 months. Further, this sol had a refractive index of 1.92.

Example 7

For Preparation of Modified Metal Oxide Sol

Step (a): 191.6 g (containing 50 g as $SnO_2$) of the acidic aqueous sol obtained in A-1-2 was diluted to 8 wt % with pure water.

Step (b): The stannic oxide aqueous sol obtained in Step (a) was added with stirring to 500 g (containing 10 g as $Sb_2O_5+SiO_2$) of the aqueous medium containing a diantimony pentaoxide-silica composite colloid and an oligomer thereof of B-2-1 and mixed in a weight ratio of (B)/(A) as calculated as metal oxides of 0.2.

Step (c): The aqueous medium obtained in Step (b) was aged by heating at a temperature of from 90 to 95° C. for 2 hours.

The obtained modified stannic oxide aqueous sol (diluted liquid) was concentrated by a filtration apparatus with an ultrafilter membrane with a molecular weight cutoff of 50,000 at room temperature to obtain 472 g of a high concentration modified stannic oxide aqueous sol. This sol had a pH of 1.87, a viscosity of 2.3 c.p. and a concentration of 12.7 wt % as calculated as metal oxides and was stable.

While 9 liters of methanol was gradually added to 472 g of the above high concentration modified stannic oxide aqueous sol, water was distilled off by a rotary evaporator under reduced pressure at a liquid temperature of at most 30° C. to obtain 190 g of a modified stannic oxide methanol sol having water in the aqueous sol replaced with methanol. This sol had a specific gravity of 1.091, a pH of 2.06 (mixture with water in an equal weight), a viscosity of 1.6 c.p., a concentration of 30.3 wt % as calculated as metal oxides, a transmittance of 68%, a water content of 0.9 wt % and particle sizes of from 10 to 15 nm as observed by an electron microscope. This sol showed a colloidal color and had a high transparency, and it was free from e.g. precipitates, white turbidity and thickening and was stable, even after left to stand at room temperature for 3 months. Further, the dried product of this sol had a refractive index of 1.8.

Example 8

For Preparation of Modified Metal Oxide Sol

Step (a): 500 kg of pure water was added with stirring to 9.16 kg (1.62 kg as $ZrO_2$) of a zirconium oxychloride aqueous solution (17.68% as $ZrO_2$) having zirconium oxychloride ($ZrOCl_2.8H_2O$) dissolved in pure water, and 0.40 kg of 35% hydrochloric acid was further added, and then 270 kg (10.8 kg as $SnO_2$) of the alkaline stannic oxide aqueous sol prepared in A-1-2 was added, and stirring was continued for 10 minutes. The mixed liquid was a sol having a $ZrO_2/SnO_2$ weight ratio of 0.15, showing a colloidal color and having favorable transparency.

The prepared mixed liquid was subjected to a heat treatment at a temperature of 95° C. for 5 hours with stirring to obtain 779.2 kg of a stannic oxide-zirconium oxide composite sol. The sol had a $SnO_2$ concentration of 1.38 wt %, a $ZrO_2$ concentration of 0.21 wt % and a concentration of $SnO_2+ZrO_2$ of 1.59 wt %.

Step (b) 1,111 g (containing 50 g as $SnO_2+ZrO_2$) of the stannic oxide-zirconium oxide composite sol obtained in Step (b) was gradually added with stirring to 1,050 g (containing 10 g as $Sb_2O_5+SiO_2$) of the aqueous medium containing a diantimony pentaoxide-silica composite colloid and an oligomer thereof obtained in B-2-1 and mixed in a weight ratio of $(Sb_2O_5+SiO_2)/(SnO_2+ZrO_2)$ of 0.2.

Step (c): The aqueous medium obtained in Step (b) was stirred at a temperature of from 20 to 30C for 1 hour.

Step (d): The mixed sol-like slurry obtained in Step (c) was passed through a column packed with a hydroxyl group form anion exchange resin to remove anions ($Cl^-$) contained in the sol. Then, the sol was aged by heating at a temperature of from 90 to 95° C. for from 2 to 3 hours to obtain a modified stannic oxide-zirconium oxide composite sol. This sol was a sol having a pH of 8.00 and having favorable transparency.

The obtained modified stannic oxide-zirconium oxide composite aqueous sol (diluted liquid) was continuously passed through a column packed with a cation exchange resin and a column packed with an anion exchange resin and then concentrated by a filtration apparatus with an ultrafilter membrane with a molecular weight cutoff of 50,000 to obtain 517 g of a high concentration modified stannic oxide-zirconium oxide composite aqueous sol. This sol had a pH of 3.15 and a total metal oxide concentration of 11.6 wt % and was stable.

While 8 liters of methanol was gradually added to 517 g of the above high concentration modified stannic oxide-zirconium oxide composite aqueous sol, water was distilled off by a rotary evaporator under reduced pressure at a liquid temperature of at most 30° C. to obtain 190 g of a modified stannic oxide-zirconium oxide composite methanol sol having water in the aqueous sol replaced with methanol. This sol was subjected to filtration to adjust the concentration, and the obtained modified stannic oxide-zirconium oxide composite methanol sol had particle sizes of from 10 to 15 nm as observed by an electron microscope, a specific gravity of 1.024, a viscosity of 2.5 c.p., a pH of 2.77 (mixture with water in an equal weight), a transmittance of 79%, a concentration of 25.0 wt % as calculated as metal oxides and a water content of 0.76 wt %. This sol showed a colloidal color and had high transparency, and it was free from e.g. precipitates, white turbidity and thickening and was stable, even after left to stand at room temperature for 3 months. Further, this sol had a refractive index of 1.8.

Example 9

For Preparation of Modified Metal Oxide Sol 18.1 g of glycolic acid was added and dissolved in 1.2 kg of the modified stannic oxide-zirconium oxide composite methanol sol obtained in Preparation Example 5 and left at rest overnight. The obtained sol had a specific gravity of 1.090, a viscosity of 2.9 c.p., a pH of 5.7 and a total metal oxide concentration of 30.1 wt % and was stable.

Example 10

For Preparation of Modified Metal Oxide Sol 31.5 g of glycolic acid was added and dissolved in 2.18 kg of the modified stannic oxide-zirconium oxide composite methanol sol obtained in Preparation Example 6 and left at rest overnight. The obtained sol had a specific gravity of 1.086, a viscosity of 2.8 c.p., a pH of 5.8 and a total metal oxide concentration of 30.1 wt % and was stable.

Example 11

For Preparation of Modified Metal Oxide Sol 237 g of tartaric acid and 88 g of diisopropylamine were gradually added in this order with vigorously stirring to 33.0 kg of the high concentration modified stannic oxide-zirconium oxide composite obtained in Step (d) of Preparation Example 5, and stirring was continued for 1 hour. While about 400 liters of methanol was gradually added to the obtained sol, water was distilled off by a rotary evaporator under slightly reduced pressure at a liquid temperature of at most 80° C. to obtain 22 kg of a modified stannic oxide-zirconium oxide composite methanol sol having water in the aqueous sol replaced with methanol. The obtained sol had a specific gravity of 1.102, a viscosity of 3.1 c.p., a pH of 8.2 and a total metal oxide concentration of 30.7 wt % and was stable.

Example 12

For Preparation of Modified Metal Oxide Sol 148 g of tartaric acid and 35 g of diisopropylamine were gradually added in this order with vigorously stirring to 28.5 kg of the high concentration modified stannic oxide-zirconium oxide composite obtained in Step (d) of Preparation Example 6, and stirring was continued for 1 hour. While about 400 liters of methanol was gradually added to the obtained sol, water was distilled off by a rotary evaporator under slightly reduced pressure at a liquid temperature of at most 80° C. to obtain 22 kg of a modified stannic oxide-zirconium oxide composite methanol sol having water in the aqueous sol replaced with methanol. The obtained sol had a specific gravity of 1.100, a viscosity of 2.0 c.p., a pH of 7.5 and a total metal oxide concentration of 30.6 wt % and was stable.

Example 13

For Preparation of Modified Metal Oxide Sol 5.9 g of glycolic acid was added and dissolved in 1.3 kg of the modified stannic oxide-zirconium oxide composite methanol sol obtained in Preparation Example 11 and left at rest overnight. The obtained sol had a specific gravity of 1.094, a viscosity of 1.6 c.p., a pH of 5.2 and a total metal oxide concentration of 30.3 wt % and was stable.

Example 14

For Preparation of Modified Metal Oxide Sol 3.9 g of glycolic acid was added and dissolved in 0.76 kg of the modified stannic oxide-zirconium oxide composite methanol sol obtained in Preparation Example 12 and left at rest overnight. The obtained sol had a specific gravity of 1.094, a viscosity of 1.4 c.p., a pH of 4.8 and a total metal oxide concentration of 30.4 wt % and was stable.

Example 15

For Preparation of Modified Metal Oxide Sol

The same operation as in Preparation Example 1 was carried out except that the stannic oxide colloid as the component A-1-1 in Preparation Example was changed to 1,401 g of the stannic oxide colloid as the component A-1-5, and the aqueous medium containing an alkali component-containing diantimony pentaoxide colloid and an oligomer thereof as the component B-1-1 was changed to 277.8 g of the aqueous medium containing an alkali component-containing diantimony pentaoxide colloid and an oligomer thereof as the component B-1-2 so that the weight ratio of (B)/(A) as calculated as metal oxides would be 0.1.

The obtained high concentration modified stannic oxide aqueous sol had a pH of 11.1, a viscosity of 2.5 c.p. and a concentration of 13.5 wt % as calculated as metal oxides and was stable.

While 9 liters of methanol was gradually added to 392 g of the above high concentration modified stannic oxide aqueous sol, water was distilled off by a rotary evaporator under reduced pressure at a liquid temperature of at most 30° C. to obtain 173 g of a modified stannic oxide methanol sol having water in the aqueous sol replaced with methanol. This sol had a specific gravity of 1.091, a pH of 8.7 (mixture with water in an equal amount), a viscosity of 1.0 c.p., a concentration of 30 wt % as calculated as metal oxides, a water content of 1.9 wt % and particle sizes of from 10 to 15 nm as observed by an electron microscope. This sol showed a colloidal color and had a high transparency, and it was free from e.g. precipitates, white turbidity and thickening and was stable, even after left to stand at room temperature for 3 months. Further, the dried product of this sol had a refractive index of 1.95.

Example 16

For Preparation of Modified Metal Oxide Sol

The same operation as in Preparation Example 1 was carried out except that the stannic oxide colloid as the component A-1-1 of Preparation Example 1 was changed to 5,373 g of the stannic oxide colloid as the component A-1-5, and the aqueous medium containing an alkali component-containing diantimony pentaoxide colloid and an oligomer thereof as the component B-1-1 was changed to 503 g of the aqueous medium containing an alkali component-containing diantimony pentaoxide-silica composite colloid and an oligomer thereof as the component B-2-1, so that the weight ratio of (B)/(A) as calculated as metal oxides would be 0.2.

The obtained high concentration modified stannic oxide aqueous sol had a specific gravity of 1.222, a pH of 3.2, a viscosity of 2.1 c.p. and a concentration of 19.8 wt % as calculated as metal oxides and was stable.

While 21 liters of methanol was gradually added to 2,160 g of the above high concentration modified stannic oxide aqueous sol, water was distilled off by a rotary evaporator under slightly reduced pressure to obtain 1,360 g of a modified stannic oxide methanol sol having water in the aqueous sol replaced with methanol. This sol had a specific gravity of 1.083, a pH of 6.8 (mixture with water in an equal amount), a viscosity of 1.2 c.p., a concentration of 30 wt % as calculated as metal oxides, a water content of 2.0 wt % and particle sizes of from 10 to 15 nm as observed by an electron microscope. This sol showed a colloidal color and had high transparency, and it was free from e.g. precipitates, white turbidity and thickening and was stable, even after left to stand at room temperature for 3 months. Further, the dried product of this sol had a refractive index of 1.95.

Comparative Preparation Example 1

In this Example, a titanium oxide methanol sol to be used for Comparative Examples was prepared.

587.5 g (159.8 g as $TiO_2$) of titanium tetrachloride (manufactured by Sumitomo Sitix Corporation, containing 27.2 wt % as $TiO_2$, Cl content of 32 wt %) and 2,608.5 g of water were put in a jacketed separable flask of 3 L made of glass to prepare 3,196 g of a titanium chloride aqueous solution (containing 5.0 wt % as $TiO_2$). To this aqueous solution, 50 g of 28% aqueous ammonia was added with stirring with a glass stirring rod, and the aqueous solution was hydrolyzed at 95° C. for 10 hours to obtain agglomerates of titanium oxide colloidal particles having primary particle sizes of from 4 to 8 nm.

The slurry of agglomerates of titanium oxide colloidal particles was subjected to filtration under reduced pressure with a 5B filter paper, and an excess electrolyte was removed by washing with about 40 L of water to obtain 620 g of a wet cake of titanium oxide. The obtained wet cake was dispersed in 2,576 g of water, 8.0 g of isopropylamine was added thereto to make the dispersion alkaline, and the dispersion was passed through a column packed with 200 ml of an anion exchange resin (AMBERLITE IRA-410, manufactured by Organo Corporation), to obtain 3,890 g of an alkaline titanium oxide aqueous sol. This sol was concentrated under reduced pressure by a rotary evaporator to obtain 1,070 g of a concentrated alkaline titanium oxide aqueous sol. To the obtained sol, 12.1 g of tartaric acid and 26.1 g of diisopropylamine were added with stirring. Then, while 25 L of methanol were gradually added to the sol, water was distilled off under reduced pressure to replace the aqueous medium with methanol to prepare 775.2 g of a titanium oxide methanol sol. The obtained methanol sol had a specific gravity of 0.970, a viscosity of 4.5 mPa·s, a pH (1+1) of 8.98, an electrical conductance of 1,600 μs/cm, a $TiO_2$ concentration of 20.2 wt % and a water content of 3.4 wt %.

Preparation of Coating Liquid

Example 1

To a glass reactor equipped with a magnetic stirrer, 105.3 parts by weight of γ-glycidoxypropyl trimethoxysilane corresponding to the above-described component A was added, and 36.8 parts by weight of 0.01 N hydrochloric acid was dropwise added thereto over a period of 3 hours with stirring. After the completion of the dropwise addition, stirring was carried out for 0.5 hour to obtain a partial hydrolysate of γ-glycidoxypropyltrimethoxysilane. Then, 397.8 parts by weight of the modified stannic oxide composite methanol sol covered with alkylamine-containing diantimony pentaoxide (containing 30.5 wt % as calculated as all the metal oxides) obtained in the above Preparation Example 1, 65 parts by weight of butyl cellosolve and 4.2 parts by weight of aluminum acetylacetonate as a curing agent were added to 142.1 parts by weight of the above-described partial hydrolysate of γ-glycidoxypropyltrimethoxysilane and sufficiently stirred, followed by filtration to prepare a coating liquid.

Formation of Cured Film

The above coating composition was coated on a commercially available polycarbonate plate having a refractive index nd=1.59 by spin coating, followed by heat treatment at a temperature of 120° C. for 2 hours to cure the coating film. The evaluation results are shown in Table 1.

Example 2

The same operation as in Example 1 was carried out except that 397.8 parts by weight of the modified stannic oxide composite methanol sol covered with alkylamine-containing diantimony pentaoxide (containing 30.5 wt % as calculated as all the metal oxides) of Preparation Example 2 was used instead of the modified stannic oxide composite methanol sol covered with alkylamine-containing diantimony pentaoxide of Preparation Example 1 used in Example 1. The evaluation results are shown in Table 1.

Example 3

The same operation as in Example 1 was carried out except that 397.8 parts by weight of the modified stannic oxide composite methanol sol covered with alkylamine-containing diantimony pentaoxide (containing 30.5 wt % as calculated as all the metal oxides) of Preparation Example 3 was used instead of the modified stannic oxide composite methanol sol covered with alkylamine-containing diantimony pentaoxide of Preparation Example 1 used in Example 1. The evaluation results are shown in Table 1.

Example 4

The same operation as in Preparation Example 1 was carried out except that 22.3 parts by weight of tetraethoxysilane and 77.9 parts by weight of γ-glycidoxypropylmethyldiethoxysilane corresponding to component A were used instead of γ-glycidoxypropyltrimethoxysilane corresponding to component A used in Example 1, 2.6 parts by weight of aluminum acetylacetonate and 0.5 part by weight of ammonium perchlorate were used as curing agents. The evaluation results are shown in Table 1.

Example 5

The same operation as in Example 2 was carried out except that 74.2 parts by weight of γ-glycidoxypropyltrimethoxysilane and 31.1 parts by weight of γ-glycidoxypropylmethyldimethoxysilane corresponding to component A were used instead of γ-glycidoxypropyltrimethoxysilane corresponding to component A. The evaluation results are shown in Table 1.

Example 6

The same operation as in Example 3 was carried out except that 74.2 parts by weight of γ-glycidoxypropyltrimethoxysilane and 31.1 parts by weight of γ-glycidoxypropylmethyldimethoxysilane corresponding to component A were used instead of γ-glycidoxypropyltrimethoxysilane corresponding to component A. The evaluation results are shown in Table 1.

Example 7

The same operation as in Example 1 was carried out except that 397.8 parts by weight of the modified stannic oxide methanol sol covered with alkylamine-containing diantimony pentaoxide (containing 30.5 wt % as calculated as all the metal oxides) of Preparation Example 4 was used instead of the modified stannic oxide methanol sol covered with alkylamine-containing diantimony pentaoxide of Preparation Example 1 used in Example 1.

Example 8

The same operation as in Example 1 was carried out except that 397.8 parts by weight of the modified stannic oxide-zirconium oxide composite methanol sol covered with alkylamine-containing diantimony pentaoxide (containing 30.5 wt % as calculated as all the metal oxides) of Preparation Example 5 was used instead of the modified stannic oxide methanol sol covered with alkylamine-containing diantimony pentaoxide of Preparation Example 1 used in Example 1.

Example 9

The same operation as in Example 1 was carried out except that 399.0 parts by weight of the modified stannic oxide-zirconium oxide composite methanol sol covered with alkylamine-containing diantimony pentaoxide (containing 30.4 wt % as calculated as all the metal oxides) of Preparation Example 6 was used instead of the modified stannic oxide methanol sol covered with alkylamine-containing diantimony pentaoxide of Preparation Example 1 used in Example 1.

Example 10

The same operation as in Example 1 was carried out except that 400.3 parts by weight of the modified stannic oxide methanol sol covered with diantimony pentaoxide-silica composite colloid (containing 30.3 wt % as calculated as all the metal oxides) of Preparation Example 7 was used instead of the modified stannic oxide methanol sol covered with alkylamine-containing diantimony pentaoxide of Preparation Example 1 used in Example 1.

Example 11

The same operation as in Example 1 was carried out except that 485.2 parts by weight of the modified stannic oxide-zirconium oxide composite methanol sol covered with diantimony pentaoxide-silica composite colloid (containing 25.0 wt % as calculated as all the metal oxides) of Preparation Example 8 was used instead of the modified stannic oxide methanol sol covered with alkylamine-containing diantimony pentaoxide of Preparation Example 1 used in Example 1.

Example 12

The same operation as in Example 1 was carried out except that 403.1 parts by weight of the modified stannic oxide-zirconium oxide composite methanol sol covered with alkylamine-containing diantimony pentaoxide (containing 30.1 wt % as calculated as all the metal oxides) of Preparation Example 9 was used instead of the modified stannic oxide methanol sol covered with alkylamine-containing diantimony pentaoxide of Preparation Example 1 used in Example 1.

Example 13

The same operation as in Example 1 was carried out except that 397.8 parts by weight of the modified stannic oxide-zirconium oxide composite methanol sol covered with alkylamine-containing diantimony pentaoxide (containing 30.5 wt % as calculated as all the metal oxides) of Preparation Example 10 was used instead of the modified stannic oxide methanol sol covered with alkylamine-containing diantimony pentaoxide of Preparation Example 1 used in Example 1.

Example 14

The same operation as in Example 1 was carried out except that 395.1 parts by weight of the modified stannic oxide-zirconium oxide composite methanol sol covered with alkylamine-containing diantimony pentaoxide (containing 30.7 wt % as calculated as all the metal oxides) of Preparation Example 11 was used instead of the modified stannic oxide methanol sol covered with alkylamine-containing diantimony pentaoxide of Preparation Example 1 used in Example 1.

Example 15

The same operation as in Example 1 was carried out except that 396.4 parts by weight of the modified stannic oxide-zirconium oxide composite methanol sol covered with alkylamine-containing diantimony pentaoxide (containing 30.6 wt % as calculated as all the metal oxides) of Preparation Example 12 was used instead of the modified stannic oxide methanol sol covered with alkylamine-containing diantimony pentaoxide of Preparation Example 1 used in Example 1.

Example 16

The same operation as in Example 1 was carried out except that 400.3 parts by weight of the modified stannic oxide-zirconium oxide composite methanol sol covered with alkylamine-containing diantimony pentaoxide (containing 30.3 wt % as calculated as all the metal oxides) of Preparation Example 13 was used instead of the modified stannic oxide methanol sol covered with alkylamine-containing diantimony pentaoxide of Preparation Example 1 used in Example 1.

Example 17

The same operation as in Example 1 was carried out except that 399.0 parts by weight of the modified stannic oxide-zirconium oxide composite methanol sol covered with alkylamine-containing diantimony pentaoxide (containing 30.4 wt % as calculated as all the metal oxides) of Preparation Example 14 was used instead of the modified stannic oxide methanol sol covered with alkylamine-containing diantimony pentaoxide of Preparation Example 1 used in Example 1.

Example 18

The same operation as in Example 1 was carried out except that 403.1 parts by weight of the modified stannic oxide methanol sol covered with alkylamine-containing diantimony pentaoxide (containing 30.1 wt % as calculated as all the metal oxides) of Preparation Example 15 was used instead of the modified stannic oxide methanol sol covered with alkylamine-containing diantimony pentaoxide of Preparation Example 1 used in Example 1.

Example 19

The same operation as in Example 1 was carried out except that 403.1 parts by weight of the modified stannic oxide methanol sol covered with alkylamine-containing diantimony pentaoxide-silica composite colloid (containing 30.1 wt % as calculated as all the metal oxides) of Preparation Example 16 was used instead of the modified stannic oxide methanol sol covered with alkylamine-containing diantimony pentaoxide of Preparation Example 1 used in Example 1.

Comparative Example 1

The same operation as in Example 1 was carried out except that 643.6 parts by weight of the titanium oxide methanol sol (containing 20.2 wt % as $TiO_2$) prepared in Comparative Preparation Example 1 was used instead of the sol used in Example 1. The evaluation results are shown in Table 1.

Comparative Example 2

The same operation as in Example 1 was carried out except that 433.3 parts by weight of a tin oxide methanol sol covered with fine tungstic oxide-stannic oxide composite particles (containing 30.0 wt % as $SnO_2+WO_3$) as disclosed in JP-A-3-217230 was used instead of the sol used in Example 1. The evaluation results are shown in Table 1.

Comparative Example 3

The same operation as in Example 1 was carried out except that 433.3 parts by weight of a titanium oxide-stannic oxide-zirconium oxide composite oxide colloid methanol sol (containing 30.0 wt % as $TiO_2+SnO_2+ZrO_2$) as disclosed in JP-A-10-310429 was used instead of the sol used in Example 1. The evaluation results are shown in Table 1.

Comparative Example 4

The same operation as in Example 1 was carried out except that 650.0 parts by weight of a colloidal silica (methanol sol, solid content: 20%, average particle size: 15 nm) was used instead of the sol used in Example 1. The evaluation results are shown in Table 1.

Physical properties of an optical element having a cured film, obtained in each of Examples and Comparative Examples, were measured by the following measurement methods.

(A) Scratch Resistance Test

The surface of each cured film was rubbed with a steel wool #0000, whereupon scratch resistance was visually evaluated in accordance with the evaluation standards (A), (B) and (C), wherein the degree of scratch marks increased in the order of (A), (B) and (C).

(2) Presence or Absence of Interference Fringes

The optical element having a cured film was visually observed under a fluorescent lamp and evaluated in accordance with the evaluation standards (A), (B) and (C), wherein (A) designates no substantial interference fringes observed, and in the order of (B) and (C), the occurrence of interference fringes increased.

(3) Adhesion Test

On the cured film, 100 crosscut sections with spaces of 1 mm were formed, and an adhesive tape (cellophane tape, product manufactured by NICHIBAN Co., Ltd.) was intimately adhered to the crosscut sections and then rapidly peeled, whereupon the presence or absence of peeling of the cured film after the adhesive tape was peeled was examined.

(4) Warm Water Resistance Test

The optical element was immersed in a warm water of 80° C. for 2 hours, whereupon the optical element was subjected to the same adhesion test as described above.

(5) Transparency Test

The optical element was visually examined under a fluorescent lamp in a dark room to see if there was any fogging on the cured film, in accordance with the evaluation standards (A), (B), and (C), wherein (A) designates substantially no fogging observed, and in the order of (B) and (C), the degree of fogging increased.

(6) Weather Resistance Test

The obtained optical element was subjected to outdoor exposure for 1 month, and the change in the appearance of the optical element after exposure was visually evaluated.

TABLE 1

| | Scratch resistance | Interference fringes | Adhesion | Warm water resistance | Transparency | Weather resistance |
|---|---|---|---|---|---|---|
| Example 1 | A | A | Good | Good | A | Good |
| Example 2 | A | A | Good | Good | A | Good |
| Example 3 | A | A | Good | Good | A | Good |
| Example 4 | A | A | Good | Good | A | Good |
| Example 5 | A | A | Good | Good | A | Good |
| Example 6 | A | A | Good | Good | A | Good |
| Example 7 | A | A | Good | Good | A | Good |
| Example 8 | A | A | Good | Good | A | Good |
| Example 9 | A | A | Good | Good | A | Good |
| Example 10 | A | A | Good | Good | A | Good |
| Example 11 | A | A | Good | Good | A | Good |
| Example 12 | A | A | Good | Good | A | Good |
| Example 13 | A | A | Good | Good | A | Good |
| Example 14 | A | A | Good | Good | A | Good |
| Example 15 | A | A | Good | Good | A | Good |
| Example 16 | A | A | Good | Good | A | Good |
| Example 17 | A | A | Good | Good | A | Good |
| Example 18 | A | A | Good | Good | A | Good |
| Example 19 | A | A | Good | Good | A | Good |
| Comparative Example 1 | B | A | Good | Peeled | B | Blued |
| Comparative Example 2 | B | A | Good | Partially peeled | A | Slightly yellowed |
| Comparative Example 3 | A to B | A | Good | Good | A to B | Good |
| Comparative Example 4 | A | C | Good | Good | A | Good |

The cured films of Examples 1 to 19 of the present invention were excellent in scratch resistance, absence of interference fringes, adhesion, warm water resistance, transparency and weather resistance. However, the cured films of Comparative Examples 1 and 2 were insufficient in view of scratch resistance, warm water resistance, transparency and weather resistance, and the cured film of Comparative Example 4 was unfavorable since interference fringes were observed. Further, the cured film of Comparative Example 3 was not particularly inferior practically, but was slightly inferior to the cured films of Examples 1 to 19.

INDUSTRIAL APPLICABILITY

The sol of the present invention is particularly useful as a component to improve refractive index, dyeability, chemical resistance, water resistance, moisture resistance, light resistance, weather resistance, abrasion resistance, etc. when a hard coat film is formed on a plastic lens, and it can be used for various applications.

By applying the sol of the present invention to the surface of e.g. organic fibers, textile products or paper, the flame resistance, anti-slip properties, antistatic properties, dyeability, etc., of such materials, can be improved. Further, the sol is useful as a binding agent for e.g. ceramic fibers, glass fibers and ceramics. Further, by mixing the sol with e.g. a coating agent or an adhesive, the water resistance, chemical resistance, light resistance, weather resistance, abrasion resistance, flame resistance, etc., of a cured coating film of the coating agent or the adhesive, will be improved. Further, the sol is useful commonly as a surface treating agent for e.g. metal materials, ceramic materials, glass materials and plastic materials. Further, it is useful also as a catalyst component.

The optical element having a cured film made of the coating composition of the present invention is useful for not only lenses for eyeglasses, but also lenses for cameras, window glasses for automobiles and optical filters for liquid crystal display or plasma display devices.

The present invention is based on a Japanese Patent Application No. 2002-350762 (filed on Dec. 3, 2002), a Japanese Patent Application No. 2002-350763 (filed on Dec. 3, 2002), a Japanese Patent Application No. 2003-097786 (filed on Apr. 1, 2003), a Japanese Patent Application No. 2003-097789 (filed on Apr. 1, 2003), a Japanese Patent Application No. 2003-161080 (filed on Jun. 5, 2003) and a Japanese Patent Application No. 2003-161087 (filed on Jun. 5, 2003), and their entireties are hereby included by reference.

The invention claimed is:

1. A process for producing a modified metal oxide sol, comprising:

producing a stannic oxide aqueous sol comprising stannic oxide particles, wherein sizes of the stannic oxide particles are from 4 to 50 nm, and a $SnO_2$ concentration of from 0.5 to 50 wt %;

hydrothermally treating the stannic oxide aqueous sol at a temperature of from 100 to 300° C.;

mixing the hydrothermally treated stannic oxide aqueous sol with an aqueous solution of an oxyzirconium salt having a concentration of from 0.5 to 50 wt % as calculated as $ZrO_2$;

heating the obtained mixed liquid at a temperature of from 60 to 100° C. for from 0.1 to 50 hours to prepare a stannic oxide-zirconium oxide composite aqueous sol having particle sizes of from 4 to 50 nm;

mixing the heated stannic oxide-zirconium oxide composite aqueous sol with an aqueous medium comprising $Sb_2O_5$ colloidal particles comprising an alkylamine, an oligomer thereof or a mixture thereof;

aging the aqueous mixture of the stannic oxide-zirconium oxide composite aqueous sol and aqueous medium comprising $Sb_2O_5$ colloidal particles comprising an alkylamine at a temperature of from 20 to 300° C. for from 0.1 to 50 hours; and contacting the aged aqueous mixture with an anion exchanger to remove anions present in the sol;

wherein a weight ratio of $ZrO_2/SnO_2$ in the stannic oxide-zirconium oxide composite aqueous sol is from 0.05 to 0.50, an alkylamine/$Sb_2O_5$ molar ratio in the $Sb_2O_5$ colloidal particles comprising an alkylamine is from 0.02 to 4.00, and a weight ratio of $Sb_2O_5/(SnO_2+ZrO_2)$ in the aqueous mixture of the stannic oxide-zirconium oxide composite aqueous sol and aqueous medium comprising $Sb_2O_5$ colloidal particles comprising an alkylamine is from 0.01 to 0.50, calculated as metal oxides.

* * * * *